United States Patent
Chowdhary

(10) Patent No.: US 10,445,818 B1
(45) Date of Patent: *Oct. 15, 2019

(54) SYSTEM AND METHOD FOR IDENTIFYING AND CO-ORDINATING AN ALTERNATE DELIVERY OF ONE OR MORE SELECTED ITEMS

(71) Applicant: FORMULA LABS, LLC, Trumbull, CT (US)

(72) Inventor: Manish Chowdhary, Trumbull, CT (US)

(73) Assignee: Formula Labs, LLC, Trumbull, CT (US)

(*) Notice: Subject to any disclaimer, the term of this patent is extended or adjusted under 35 U.S.C. 154(b) by 35 days.

This patent is subject to a terminal disclaimer.

(21) Appl. No.: 15/667,196

(22) Filed: Aug. 2, 2017

Related U.S. Application Data

(63) Continuation of application No. 13/834,029, filed on Mar. 15, 2013, now Pat. No. 9,760,854, which is a
(Continued)

(51) Int. Cl.
*G06Q 30/06* (2012.01)
*G06Q 10/08* (2012.01)
(Continued)

(52) U.S. Cl.
CPC ....... *G06Q 30/0637* (2013.01); *G06F 16/258* (2019.01); *G06Q 10/0833* (2013.01);
(Continued)

(58) Field of Classification Search
CPC .................................................. G06Q 30/0637
See application file for complete search history.

(56) References Cited

U.S. PATENT DOCUMENTS 5,694,551 A 12/1997 Doyle et al.
5,794,207 A 8/1998 Walker et al.
(Continued)

FOREIGN PATENT DOCUMENTS

GB 2391089 1/2004
JP 04233003 8/1992

OTHER PUBLICATIONS

Ray, Allen, and Gordon, David, "He Said/She Said," Electrical Wholesaling, 89.5, Penton Media, Inc., Penton Business Media, Inc. and their subsidiaries, May 1, 2008.*
(Continued)

*Primary Examiner* — Nathan Erb
(74) *Attorney, Agent, or Firm* — Amster, Rothstein & Ebenstein LLP

(57) ABSTRACT

A method is disclosed for optimizing an order for a product for delivery. The method includes receiving an order for a product from a first requestor, the order identifying a delivery timeframe. The method also includes identifying an undelivered shipment of the product associated with an existing order of a second party. The method further includes transmitting a request to reroute the undelivered shipment of the product to the first requestor within the delivery timeframe. The method still further includes processing the order for the product. The processing includes arranging delivery of the product to the second party. Systems and apparatus are also disclosed to implement the disclosed methods.

26 Claims, 20 Drawing Sheets

Related U.S. Application Data continuation of application No. 13/797,555, filed on Mar. 12, 2013, now Pat. No. 10,043,148.

(60) Provisional application No. 61/649,865, filed on May 21, 2012.

(51) Int. Cl.
    *G06Q 20/14*     (2012.01)
    *G06F 16/25*     (2019.01)

(52) U.S. Cl.
CPC ... *G06Q 10/0838* (2013.01); *G06Q 10/08355* (2013.01); *G06Q 20/14* (2013.01); *G06Q 30/0621* (2013.01)

(56) References Cited

U.S. PATENT DOCUMENTS

| | | | |
|---|---|---|---|
| 5,903,639 A | 5/1999 | Lipchock et al. | |
| 5,963,915 A | 10/1999 | Kirsch | |
| 5,966,697 A | 10/1999 | Fergerson et al. | |
| 5,974,399 A | 10/1999 | Giuliani et al. | |
| 6,035,291 A | 3/2000 | Thiel | |
| 6,076,070 A | 6/2000 | Stack | |
| 6,249,772 B1 | 6/2001 | Walker et al. | |
| 6,285,986 B1 | 9/2001 | Andrews | |
| 6,304,854 B1 | 10/2001 | Harris | |
| 6,374,227 B1 | 4/2002 | Ye | |
| 6,405,174 B1 | 6/2002 | Walker et al. | |
| 6,519,574 B1 | 2/2003 | Wilton et al. | |
| 6,549,892 B1 | 4/2003 | Sansone | |
| 6,754,636 B1 | 6/2004 | Walker et al. | |
| 6,970,837 B1 | 11/2005 | Walker et al. | |
| 7,020,625 B2 | 3/2006 | Tilley et al. | |
| 7,054,838 B2 | 5/2006 | Sutton et al. | |
| 7,099,832 B2 | 8/2006 | Walker et al. | |
| 7,107,225 B1 | 9/2006 | McClung, III | |
| 7,107,228 B1 | 9/2006 | Walker et al. | |
| 7,124,107 B1 | 10/2006 | Pishevar et al. | |
| 7,130,803 B1 | 10/2006 | Couch et al. | |
| 7,197,475 B1 | 3/2007 | Lorenzen et al. | |
| 7,212,991 B2 | 5/2007 | Chowdhary et al. | |
| 7,222,081 B1 | 5/2007 | Sone | |
| 7,236,942 B1 | 6/2007 | Walker et al. | |
| 7,295,997 B2 | 11/2007 | Estes et al. | |
| 7,373,317 B1 | 5/2008 | Kopelman et al. | |
| 7,383,222 B2 | 6/2008 | Keith | |
| 7,472,077 B2 | 12/2008 | Roseman et al. | |
| 7,493,274 B2 | 2/2009 | Bezos et al. | |
| 7,536,360 B2 | 5/2009 | Stolfo et al. | |
| 7,548,877 B2 | 6/2009 | Palazzo | |
| 7,577,582 B1 | 8/2009 | Ojha et al. | |
| 7,590,565 B2 | 9/2009 | Ward et al. | |
| 7,637,426 B1 | 12/2009 | Green | |
| 7,657,461 B2 | 2/2010 | Young | |
| 7,769,672 B2 | 8/2010 | Keith | |
| 7,774,234 B1 | 8/2010 | Kopelman et al. | |
| 7,813,970 B1 | 10/2010 | Brandwine et al. | |
| 7,853,481 B1 | 12/2010 | Johnson | |
| 8,015,099 B2 | 9/2011 | Reid | |
| 8,036,943 B2 | 10/2011 | Walker et al. | |
| 8,046,262 B1 | 10/2011 | Antony et al. | |
| 8,082,183 B2 | 12/2011 | Chowdhary | |
| 8,086,546 B2 | 12/2011 | Spiegel et al. | |
| 8,112,359 B2 | 2/2012 | Walker et al. | |
| 8,117,079 B1 | 2/2012 | Brandwine et al. | |
| 8,117,082 B1 | 2/2012 | Brandwine et al. | |
| 8,126,777 B2 | 2/2012 | Postelnik et al. | |
| 8,442,869 B2 | 5/2013 | Chowdhary | |
| 8,620,759 B1 | 12/2013 | Virgilio et al. | |
| 8,694,389 B1 | 4/2014 | Chowdhary | |
| 8,799,138 B2 | 8/2014 | Keith | |
| 8,812,228 B2 | 8/2014 | Konig | |
| 9,760,854 B1 * | 9/2017 | Chowdhary | G06Q 10/083 |
| 9,824,380 B1 | 11/2017 | Chowdhary et al. | |
| 2001/0042040 A1 | 11/2001 | Keith | |
| 2002/0059121 A1 | 5/2002 | Schneider et al. | |
| 2002/0116273 A1 | 8/2002 | Sundel | |
| 2002/0147663 A1 | 10/2002 | Walker et al. | |
| 2002/0152125 A1 | 10/2002 | Goedde | |
| 2002/0152128 A1 | 10/2002 | Walch et al. | |
| 2002/0165729 A1 | 11/2002 | Kuebert et al. | |
| 2002/0184104 A1 | 12/2002 | Littman | |
| 2003/0033205 A1 | 2/2003 | Nowers et al. | |
| 2003/0037009 A1 | 2/2003 | Tobin et al. | |
| 2003/0046133 A1 | 3/2003 | Morley et al. | |
| 2003/0065586 A1 | 4/2003 | Shaftel et al. | |
| 2003/0069798 A1 | 4/2003 | Hoffman | |
| 2003/0074206 A1 | 4/2003 | Hoffman et al. | |
| 2003/0083949 A1 | 5/2003 | Kar | |
| 2003/0158791 A1 | 8/2003 | Gilberto et al. | |
| 2003/0189090 A1 | 10/2003 | Holden | |
| 2003/0208411 A1 | 11/2003 | Estes et al. | |
| 2004/0117328 A1 | 6/2004 | Andrew | |
| 2004/0193482 A1 | 9/2004 | Hoffman et al. | |
| 2004/0220845 A1 | 11/2004 | Malapitan | |
| 2005/0021856 A1 | 1/2005 | Basile et al. | |
| 2005/0033655 A1 | 2/2005 | Woolston | |
| 2005/0177437 A1 | 8/2005 | Ferrier | |
| 2006/0136300 A1 | 6/2006 | Kopelman et al. | |
| 2007/0005487 A1 | 1/2007 | Keith | |
| 2007/0005488 A1 | 1/2007 | Keith | |
| 2007/0192299 A1 | 8/2007 | Zuckerber et al. | |
| 2007/0282701 A1 * | 12/2007 | Hirayama | G06Q 30/06 705/26.8 |
| 2008/0004995 A1 | 1/2008 | Klingenberg et al. | |
| 2008/0065500 A1 | 3/2008 | Foth et al. | |
| 2008/0208772 A1 | 8/2008 | Rundle et al. | |
| 2008/0255966 A1 | 10/2008 | Kopelman et al. | |
| 2009/0164390 A1 | 6/2009 | Calman et al. | |
| 2009/0240554 A1 | 9/2009 | Oswald et al. | |
| 2010/0324978 A1 | 12/2010 | Redmann et al. | |
| 2011/0010287 A1 | 1/2011 | Mittal et al. | |
| 2011/0047022 A1 | 2/2011 | Walker et al. | |
| 2011/0251788 A1 | 10/2011 | Yarvis et al. | |
| 2012/0197722 A1 * | 8/2012 | Mesaros | G06Q 30/0261 705/14.58 |
| 2013/0211957 A1 | 8/2013 | Greene et al. | |
| 2013/0297457 A1 * | 11/2013 | Zhu | G06Q 30/06 705/26.81 |
| 2013/0325741 A1 | 12/2013 | Smalling et al. | |
| 2016/0071050 A1 | 3/2016 | Kaye | |
| 2017/0132552 A1 | 5/2017 | Pothukuchi et al. | |

OTHER PUBLICATIONS

Shamlaty, Ron. "This is not you father's warehouse". IIE Solutions. vol. 32, No. 1, p. 30. Jan. 2000.

"ChemConnect and GE Operation Services Announce Inventory Management Solution Agreement". Business Editors. Business Wire. Feb. 11, 2002. p. 0225. [recovered from Dialod database on Nov. 20, 2006].

Enright, Allison. "Staples lets Amazon use stores as package pickup points." Internet Retailer. Nov. 8, 2012. www.internetretailer.com2012/11/08.

Deatsch, Katie. "Do consumers want same-day shipping?" Internet Retailer. Jan. 24, 2013. www.internetretailer.com2013/01/24.

Trull, Jeffrey. "7 Same-Day Delivery Options for Online Shopping." Money Talks News. Jan. 30, 2013 www.moneytalksnews.com/2013/01/30/7.

"Same-day-delivery is retail's new frontier." MSN Money. Jan. 10, 2013. www.money.msn.com/saving/money-tips/post.

Parry, Tim. "Ship-from-store Helps Macy's Compete With Pureplays." MultiChannel Merchant. Jan. 16, 2013. multichannelmerchant.com.

Di Stefano, Theodore F. "Amazon's Same-Day Delivery Will Shake Up Retail." E-Commerce News. Jan. 17, 2013. www.ecommercetimes.com/story/Amazons.

Tuttle, Brad. "Same-Day Delivery: Losing Money is O.K. if You're Winning Over Customers." TIME.com. Dec. 4, 2012. business.time.com/2012/12/04.

(56) References Cited

OTHER PUBLICATIONS

Lynch, Erin. "Same-day Delivery Transforms Retail." Dec. 18, 2012.
Cantrell, Vicki. "Instant convenience: How same-day delivery and in-store pick up are transforming retail." Dec. 13, 2012.
"Same-day delivery plots a comeback." Dec. 26, 2012.
Rueter, Thad. "Amazon gives Prime its props." Aug. 27, 2012.
Enright, Allison. "ShopRunner picks up the pace." Jun. 17, 2012.
Rueter, Thad. "Google could threaten Amazon and eBay with a new shipping service, an analyst says." Dec. 1, 2011.
Enright, Allison. "More stores will become online order pickup points." Apr. 25, 2012.
Demery, Paul. "UPS tries to reduce delivery headaches for online shoppers." Sep. 19, 2011.
Enright, Allison. "Amazon tests a package pick-up option at local retail stores." Dec. 5, 2011.
Enright, Allison. "Have It Your Way." Dec. 31, 2011.
Enright, Allison. "eBay tests same-day delivery." Aug. 6, 2012.
Schuman, Evan. "Amazon: Same-Day Delivers More Conversions, Few Actual Users." Jan. 3, 2013.
Schuman, Evan. "Walmart Same-Day Trial: Can Dec. 24 Be E-tail Windfall?" Oct. 10, 2012.
Clifford, Stephanie and Miller, Claire Cain. "Instantly Yours, for a Fee." Dec. 27, 2012.
Gallaher, Dan. "Amazon's cost of speedy delivery prompts analyst rating cut." Apr. 2, 2012.
Demery, Paul. "ShopRunner adds a receipt-tracking service."
Affidavit of Manish Chowdhary Under C.F.R. 132, submitted in U.S. Appl. No. 13/834,029, on Jan. 9, 2017.
Affidavit of Manish Chowdhary Under C.F.R. 132, submitted in U.S. Appl. No. 13/797,555, on Jan. 10, 2017.

\* cited by examiner

OPTIONS

*Please select one of the following trading choices:*

|  | Savings | Delivery Estimate | Trader Type | RELATIONSHIP(s)? | VENDOR RATING | System Fee |
|---|---|---|---|---|---|---|
| Option 1 | $3 | 4-6 Days | Customer | Facebook Friend | B | $1 |
| Option 2 | $7 | 4-5 Days | Vendor | None | A+ | $1 |
| Option 3 | $5 | 2-4 Days | Carrier | None | B+ | $1 |
| Option 4 | -$5 | 1 Day | Vendor | None | B | $4 |
| Option 5 | -$2 | 2 Days | Customer + Carrier | None | B | $2 |

CANCEL

FIG. 8A

OPTION 1

*Please Confirm Your Selection*

Customer A receives:

*Customer B's Order: Product X, Model Y*
*Delivery Estimate: 4-6 Days*
*Vendor Rating: B*
*Savings: $3*

Customer B - John Doe - Facebook Friend receives:

*Customer A's Order: Product X, Model Y*
*Delivery Estimate: 3-5 Days*
*Vendor Rating: B*
*Savings: $3*

CONFIRM

FIG. 8B

OPTION 5

*Please Confirm Your Selection*

Customer A receives:

> *Customer C's Order: Product X, Model Y2*
> *Delivery Estimate: 2 Days*
> *Vendor Rating: A+*
> *Savings: $3*

Customer B - John Doe - Facebook Friend receives:

> *Customer A's Order: Product X, Model Y1*
> *Delivery Estimate: 3-5 Days*
> *Vendor Rating: B*
> *Savings: $3*

Shipping Company X's - (Customer Name Withheld) receives:

> *Customer B's Order: Product X, Model Y1*
> *Delivery Estimate: 2-4 Days*
> *Vendor Rating: B*
> *Savings: (Withheld)*

[ CONFIRM ]

FIG. 8C

SYSTEM AND METHOD FOR IDENTIFYING AND CO-ORDINATING AN ALTERNATE DELIVERY OF ONE OR MORE SELECTED ITEMS

CROSS-REFERENCE TO RELATED APPLICATION

The present patent application is a Continuation of U.S. patent application Ser. No. 13/834,029, filed on Mar. 15, 2013, which is a Continuation of U.S. patent application Ser. No. 13/797,555, filed on Mar. 12, 2013, which application claims the benefit of U.S. Provisional Patent Application Ser. No. 61/649,865, filed May 21, 2012, the entirety of each of which is hereby incorporated by reference.

The present application also relates to U.S. patent application Ser. No. 14/246,943, filed Apr. 7, 2014 which is a continuation of U.S. patent application Ser. No. 13/835,160, filed Mar. 15, 2013 (now U.S. Pat. No. 8,694,389), which is a continuation of U.S. patent application Ser. No. 13/330,644, filed Dec. 19, 2011 (now U.S. Pat. No. 8,442,869), which is a continuation of U.S. patent application Ser. No. 11/691,169, filed Mar. 26, 2007 (now U.S. Pat. No. 8,082,183) and which in turn is a continuation of U.S. patent application Ser. No. 10/229,838, filed Aug. 27, 2002 (now U.S. Pat. No. 7,212,991). The entirety of the above-referenced applications are incorporated by reference herein for all purposes.

FIELD

The present invention relates generally to automated systems and methods for coordinating business transactions, including using the Internet.

SUMMARY

In exemplary embodiments, the present disclosure relates to systems and methods for providing alternative delivery options. In exemplary embodiments, one or more electronic databases stored on one or more computer-readable storage media operatively connected to one or more computers, may be accessed with the databases comprising information for a plurality of respective orders, including for each respective order: (i) order identification information identifying the respective orders; (ii) product information identifying one or more ordered products associated with the respective orders; (iii) shipping information identifying one or more shipping companies associated with the respective orders; (iv) package tracking information identifying package status associated with delivery of the respective orders; and (v) recipient information identifying recipient addresses associated with the respective orders. In exemplary embodiments, the one or more computers may receive a request from a first requestor device to identify an alternate delivery option for a first existing order, wherein the first order may include at least a first product. The first existing order may be an order that is in-transit, or an order that has been placed but not yet delivered, or pending fulfillment. The one or more computers may further receive order information relating to the first existing order, wherein the order information may include product information and recipient information. The data in the databases may be updated by the one or more computers, using the order information associated with the received request. The one or more computers, may further determine using data in the databases, one or more undelivered in-transit orders which includes a second product matching the first product and may determine one or more options to reroute at least one of the determined undelivered in-transit orders based at least in part on the received request from the first requestor device; and provide, from the one or more computers to the first requestor device, at least one of the one or more options to reroute.

In exemplary embodiments, the one or more computers may obtain a first selection of the one or more provided options and may transmit to a first shipping company associated with the first received selection option, a request to reroute a first undelivered in-transit order associated with the first received selection option to an address associated with the first requestor. In exemplary embodiments, the first selection may be obtained at the one or more computers as a manual selection from the first requestor device. In some exemplary embodiments, the first selection may be obtained as an automatic selection based at least in part on pre-existing preferences associated with the first requestor device.

In exemplary embodiments, after obtaining the first selection, the one or more computers may further transmit a request to order one or more products associated with the first undelivered in-transit order to be delivered to an address associated with the received selected option.

In exemplary embodiments, after obtaining the first selection, the one or more computers may transmit a request, to a second shipping company associated with the first existing order, to reroute the first existing order to a second address. The second address may be associated the first received selected option. The second shipping company may be the same or different than the first shipping company.

In exemplary embodiments, after obtaining the first selection, the one or more computers may further transmit to a vendor associated with the first existing order, a request to cancel the first existing order or a request to modify at least the recipient information associated with the first existing order.

In exemplary embodiments, after obtaining the first selection, the one or more computers may obtain one or more authorizations to reroute the undelivered in-transit orders associated with received selected option.

In exemplary embodiments, the first requestor device may be associated with a customer, a vendor, and/or a shipping company. In exemplary embodiments, the one or more computers may receive the request and the order information together or separately. In some exemplary embodiments, the request information may be received from the first requestor device and the order information may be received from a different device than the first requestor device.

In exemplary embodiments, after obtaining the first selection, the one or more computers obtain package tracking information for the first undelivered in-transit order.

In exemplary embodiments, after obtaining the first selection, the one or more computers charge a fee to at least one party associated with the first existing order and/or the first received selected option, such as a customer, a vendor, and/or a shipping company.

In some exemplary embodiments, the one or more options may be based at least in part on shipping costs and/or the time required to reroute the first undelivered in-transit order to a recipient address associated with the first existing order. In some exemplary embodiments, the one or more options may be based at least in part on a social network relationships between the first requestor and one or more parties and/or may be based at least in part on pre-existing preferential statuses of one or more parties. The one or more parties may be associated with the determined undelivered in-transit orders.

In exemplary embodiments, after obtaining the first selection, the one or more computers may update the data in the databases with the information associated with the first received selection of the one or more options. The one or more computers may determine, using data from the databases, a second set of one or more undelivered orders including at least a product matching the second product. Based on the determined second set of undelivered orders, the one or more computers may determine a second set of one or more options to direct at least one of the second set of undelivered orders to a second address which is associated with the first undelivered in-transit order and provide to a device associated with the first undelivered in-transit order, at least one of the second set of options.

In exemplary embodiments, wherein the order information may include further information, such as, for example, shipping company information, shipping service type information, shipping cost information, payment information, and/or combinations thereof.

In exemplary embodiments, after the one or more computers provide at least one of the one or more options to reroute to the first requestor device, the one or more computers may further obtain updated information for the one or more of the plurality of respective orders, for example at a later time. This information may relate to the respective shipping information or the respective package tracking information. The one or more computers, may update the data in the databases with the obtained updated information and then may use the data in the databases to determine a second set of one or more undelivered in-transit orders which include a product matching the first product. Based on this determination, the one or more computers may further determine a second set of one or more options to reroute at least one of the second set of undelivered in-transit orders based at least in part on the received request from the first requestor device. One or more of these determined options may be provided by the one or more computers to the first requestor device.

In exemplary embodiments, after the one or more computers provide at least one of the one or more options to reroute to the first requestor device, the one or more computers may further obtain additional information for the one or more additional orders, for example at a later time. The one or more computers, may update the data in the databases with the obtained additional information and then may use the data in the databases to determine a second set of one or more undelivered in-transit orders which include a product matching the first product. Based on this determination, the one or more computers may further determine a second set of one or more options to reroute at least one of the second set of undelivered in-transit orders based at least in part on the received request from the first requestor device. One or more of these determined options may be provided by the one or more computers to the first requestor device.

In exemplary embodiments, a system may comprise one or more electronic databases stored on one or more computer-readable storage media, with the databases comprising information for a plurality of respective orders including for each respective order: (i) order identification information identifying the respective orders (ii) product information identifying one or more products associated with the respective orders; (iii) shipping information identifying one or more shipping companies associated with the respective orders; (iv) package tracking information identifying package status associated with delivery of the respective orders; and (v) recipient information identifying recipient addresses associated with the respective orders. The system may comprise one or more processors operatively connected to the one or more electronic databases and configured to perform the following steps: (i) receiving, at the one or more computers from a first requestor device, a request to identify an alternate delivery option for a first existing order, wherein the first existing order contains a first product; (ii) receiving, at the one or more computers, order information relating to the first existing order, wherein the order information including product information and recipient information; (iii) updating, by the one or more computers, the data in the databases with order information associated with the received request; (iv) determining, by the one or more computers using data in the databases, one or more undelivered in-transit orders including a second product matching the first product; (v) determining, by the one or more computers, one or more options to reroute at least one of the identified undelivered in-transit orders based at least in part on the received request from the first requestor device; and (vi) providing, from the one or more computers to the first requestor device, at least one of the one or more options to reroute.

In exemplary embodiments, one or more electronic databases stored on one or more computer-readable storage media operatively connected to one or more computers, may be accessed with the databases comprising information for a plurality of respective orders, including for each respective order: (i) order identification information identifying the respective orders; (ii) product information identifying one or more ordered products associated with the respective orders; (iii) delivery information identifying one or more delivery entities, service types, and delivery costs associated with the respective orders; (iv) package tracking information identifying package status associated with delivery of the respective orders; and (v) recipient information identifying recipient addresses associated with the respective orders. In exemplary embodiments, the one or more computers may obtain from a customer device associated with a first customer, a first indication of interest related to one or more products. The one or more computers may also obtain product information relating to the one or more products and customer information related to the first customer. The one or more computers, may further determine using data in the databases, one or more undelivered orders which includes a second product matching one or more products associated with the first indication of interest; determine one or more options to direct at least one of the determined undelivered orders to an address associated with the first customer based at least in part on the first indication of interest; and provide, from the one or more computers to the customer device, at least one of the one or more options to the customer device. In exemplary embodiments, delivery information may include and/or refer to information related to shipping companies, shipping services/options, in-person or in-store pickup of orders, and the like.

In exemplary embodiments, after providing one or more options to direct the customer device, the one or more computers may obtain a first selection of the one or more provided options from the customer device. The first selection may be associated with a first undelivered order. The first selection may be obtained at the one or more computers as a manual selection, or may be obtained as an automatic selection based pre-existing preferences associated with the first customer. The one or more determined undelivered orders may be in-transit or may be an existing or placed order that has not been shipped.

In exemplary embodiments, after the one or more computers obtain a first selection from the customer device, one or more authorizations to direct the first undelivered order may be received.

In exemplary embodiments, after the one or more computers obtain a first selection from the customer device, the one or more computers may transmit to a second party associated with the first undelivered order, a request to direct the first undelivered order to the address associated with the first customer. The second party may be a delivery entity company, a vendor, and/or a second customer.

In exemplary embodiments, the one or more provided options may be based at least in part on social network relationships between the first customer and one or more parties associated with the one or more determined undelivered orders. In some exemplary embodiments, the one or more computers may provide to the customer device the social network relationships between the first customer and the one or more parties associated with the one or more provided options.

In some exemplary embodiments, transmitting a request to direct the first undelivered order may include transmitting a request to order one or more products associated with the first indication of interest.

In some exemplary embodiments, transmitting a request to direct the first undelivered order may include transmitting hold the undelivered order associated with the first indication of interest at a location for pickup by the first customer.

In some exemplary embodiments, transmitting a request to direct the first undelivered order may include transmitting a request to modify at least the recipient information associated with the determined undelivered order.

In exemplary embodiments, one or more determined options may be based at least in part on delivery costs to direct an undelivered order to the address associated with the first customer. In exemplary embodiments, one or more determined options may be based at least in part on the time required to deliver at least one of the identified undelivered orders to the address associated with the first customer. In exemplary embodiments, one or more determined options may be based at least in part on pre-existing preferential statuses of at least one of the first customer and one or more parties associated with the determined undelivered orders.

In exemplary embodiments, after transmitting a request to direct the first determined undelivered order to the address associated with the first customer, the one or more computers may update the data in the databases with the information associated with the first received selection and then may generate a second indication of interest, wherein the second indication of interest is associated with the second party and relates to a second set of one or more products associated with the first determined undelivered order. The one or more computers may further determine a second set of one or more undelivered orders which include at least one product matching the second set of products. The one or more computers may determine a second set of one or more options to direct at least one of the second set of undelivered orders identified to a second address associated with the second party. At least one of the second set of options may be provided to a device associated with the second party.

In exemplary embodiments, the customer information may further include such as customer address information, delivery information, and/or payment information.

In exemplary embodiments, after the one or more computers obtain a first selection from the customer device, the one or more computers may charge a fee to the first customer and/or any parties associated with the first selection, such as a customer, a vendor, and/or a shipping company.

In exemplary embodiments, after providing one or more options to direct the customer device, the one or more computers perform to the steps of obtaining updated information related to the respective delivery information or the respective package tracking information; updating the data in the databases with the updated information; determining, using data in the databases, a second set of one or more undelivered orders including a product matching the first product; determining, a second set of one or more options to direct at least one of the second set of undelivered orders identified based at least in part on the received indication of interest from the first customer device; and providing, to the first customer device, at least one of the one or more determined options.

In exemplary embodiments, after providing one or more options to direct the customer device, the one or more computers perform to the steps of obtaining, second order information related to one or more additional orders; updating the data in the databases with the second order information; determining, using data in the databases, a second set of one or more undelivered orders including a product matching the first product; determining a second set of one or more options to direct at least one of the second set of undelivered orders identified previously, based at least in part on the received request from the first requestor device; and providing to the first requestor device, at least one of the one or more determined options to direct previously identified.

In exemplary embodiments, a system may comprise one or more electronic databases stored on one or more computer-readable storage media the databases comprising information for a plurality of orders including for each respective order: (i) order identification information identifying the respective orders; (ii) product information identifying one or more products associated with the respective orders; (iii) delivery information identifying one or more delivery entities associated with the respective orders to the extent such information is available; (iv) package tracking information identifying package status associated with the delivery of the respective orders to the extent such information is available; and (v) recipient information identifying recipient addresses associated with the respective orders. The system may further comprise one or more processors operatively connected to the one or more electronic databases and configured to perform the following steps: (i) obtaining at the one or more computers from a customer device, a request to identify an indication of interest related to one or more products; (ii) obtaining at the one or more computers, product order information relating to one or more products and customer information related to a customer; (iii) determining by the one or more computers using data in the databases, one or more undelivered orders including at least a second product matching the one or more products associated with the indication of interest; (iv) determining by the one or more computers, one or more options to direct at least one of the determined undelivered orders to an address associated with the customer, based at least in part on the obtained first indication of interest; and (vi) providing from the one or more computers to the customer device, at least one of the one or more options to direct.

BRIEF DESCRIPTION OF THE DRAWINGS

The features and advantages of the disclosure can be more fully understood with reference to the following description of the disclosure when taken in conjunction with the accompanying figures, wherein:

FIGS. 8A-8C are exemplary schematic interface representations illustrating various aspects of the methods of optimizing an order in accordance with exemplary embodiments of the present disclosure.

DETAILED DESCRIPTION

The present disclosure generally relates to systems and methods for coordinating business transactions between vendors of products, consumers/customers, and/or shipping companies/carriers.

Figure 1:
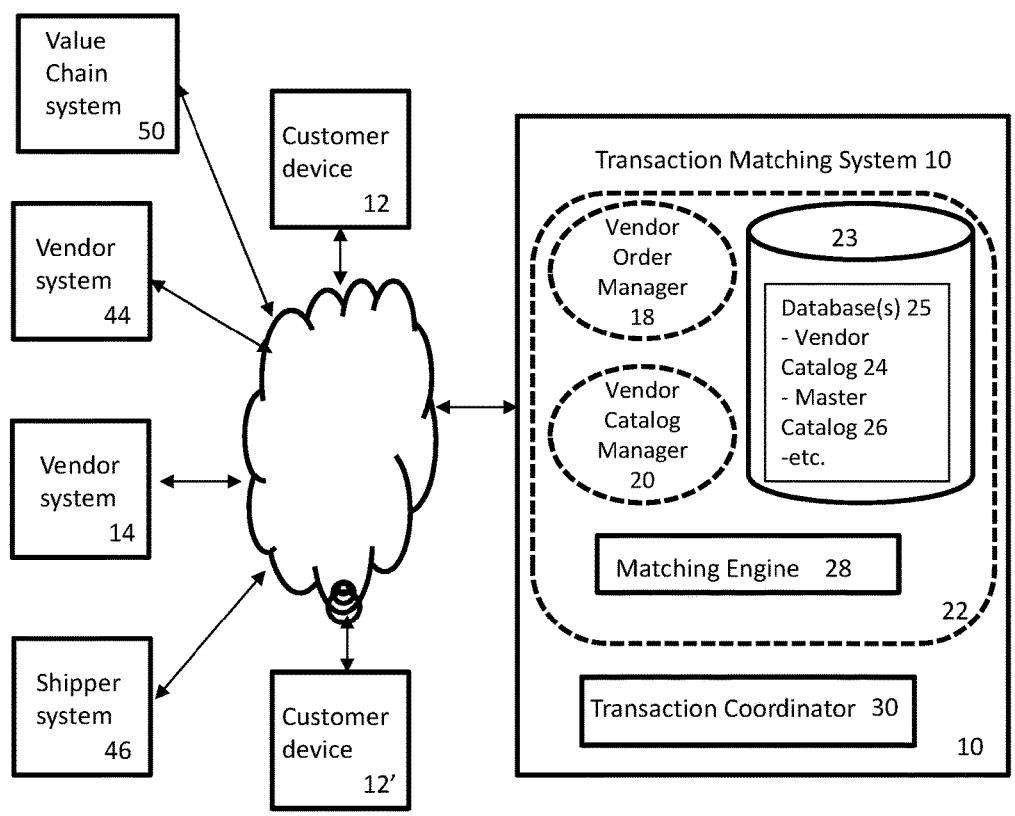
FIG. 1 is a schematic representation illustrating a transaction coordination system interacting with one or more parties according to an exemplary embodiment of the present disclosure.

As shown in FIG. 1, a system in accordance with exemplary embodiments may include as combination of some or all of the following components:

(i) one or more customer electronic devices 12 (such as desk top computers, lap top computers, tablets, mobile phones, portable electronic devices, etc.) through which respective consumers can access website(s), or any other type of network accessible interfaces associated with one or more vendors;

(ii) one or more vendor systems 14 and 44 (such as computer, server, computer network, etc.) operatively coupled to one or more websites associated with one or more vendors which can communicate purchase-related information with consumers;

(iii) shipping system 46 associated with one or more shipping organizations which can place and track shipping orders;

(v) value chain system 50 (such as computer, server, computer network, etc.) associated with one or more value chain organizations which may provide services with respect to vendors and/or shipping companies; and (iv) a transaction coordination system/hub 10 (which can be made up of one or more computers or servers) operatively coupled to the vendor computers.

For any given transaction, vendors may participate as a selling vendor (e.g., a vendor who may sell a product to a consumer), or as a shipping vendor (e.g., a vendor who may provide, ship, and/or fulfill the product to a consumer/customer). In some exemplary embodiments, where a consumer interacts directly with the hub 10, there may be no selling vendor involved. For example, customers may act as a shipping vendor without the vendor system 14, 44 hardware/software. In other words, a customer may act as vendor and/or shipping company so as to deliver an order and/or a product to a requesting party directly with or without assistance of a shipping company. For example, a transaction option may include a customer physically delivering or picking up an order item from another party, at a mutually convenient location designated by the system 10.

The transaction coordination hub 10 may include a catalog subcomponent 22 which stores detailed vendor-related data and a transaction coordinator subcomponent 30 which coordinates transactions between and/or among one or more customers/consumers, selling vendors, shipping vendors and/or shipping organizations.

In an exemplary embodiment, the catalog subcomponent may also comprise electronic data associated with one or more shipping vendors, product information offered by each vendor, product coordinating information for correlating identical or interchangeable products offered by different vendors. An identical or interchangeable product may, for example, be products with the same product identification number where available, e.g., UPC, EAN, GTIN, etc and in similar condition e.g., New, Refurbished, Used, etc. This catalog subcomponent may be made up of one or more than one databases, such as a plurality of vendor catalog databases, at least one master catalog database, and a mapping engine for mapping information in the vendor catalogs to the master catalog.

The transaction coordinator hub 10 may further include an optimal deal finding software module 32 which may analyze various types of data, such as, for example, data found in the catalog subcomponent, and may match vendors, shipping carriers, consumers, and the like to execute one or more business transactions. In exemplary embodiments, the optimal deal finding software module 32 may also analyze other data located within the system/hub, and/or located remote thereto, to execute the one or more business transactions.

In exemplary embodiments, the transaction coordination hub 10 may be operatively connected to one or more shipping companies/carriers systems 46 in order to access, process, modify and/or monitor shipping requests and inquiries received at the transaction coordination hub. The transaction coordinator software component may include a shipping manager software module 34 which communicates with the server(s) to connect to the shipping companies systems. The transaction coordinator subcomponent may further include a shipping manager software module, a vendor order manager software module, a vendor catalog manager software module, a vendor rating manager software module, a payment manager software module, a notification alert manager software module, and an auction manager software module.

The systems and methods of the present disclosure can reduce unnecessary costs usually associated with the processing of transactions performed on-line. It may enable vendors to collaborate towards fulfilling customer orders and share profits anonymously while not having to deal with the intricacies of transacting or even identifying a transaction partner. The vendors which are part of the system form an economy-scale network that can dramatically optimize various aspects of sales and inventory movement, extending the market outreach of its members to national and international levels, regardless of their size. The present application also provides for the possibility of secondary revenue streams that utilize information collected in the system as part of its normal activity.

Exemplary Parties to a Transaction:

In exemplary embodiments, a transaction coordination system is provided for use with Internet or web-based transactions, such as, for example, those involving the purchase of consumer goods. FIG. 1 shows, according to an exemplary embodiment, a transaction that may involve a plurality of parties, such as, for example: (i) one or more consumers who place one or more orders from a customer device 12 which is connected to the Internet; (ii) the vendor who offers a particular product for sale on their website, referred to as a "selling vendor"; (iii) transaction coordination system 10, which also may be referred to as "hub" or the "system 10"; (iv) a vendor who may arrange for delivery of the ordered product to the consumer, referred to as a "shipping vendor"; and (v) Shipping/logistics company, such as, for example, Federal Express, USPS or UPS, may also participate in a given transaction. Further, other types of organizations, "value chain" companies may also participate such as payment processors (e.g., PayPal, Cybersource, FirstData, Google Checkout, Square), transactional email providers (e.g., ExactTarget, Responsys, StrongMail), shipping solution providers (e.g. Pitney Bowes, TrueShip, Stamps.com, Dymo Endicia), sales tax calculation and remittance services (e.g., Avalara, Vertex), personalization and recommendation system providers (e.g. MyBuys, Certona, Baynote), purchase guarantee, protection, insurance, and warranty providers (e.g. BuySAFE, SquareTrade).

It is important to note that the role of selling vendor and shipping vendor may be reversed in some circumstances. For example, a selling vendor in one transaction may participate as a suitable shipping vendor in another transaction. In other words in exemplary embodiments, a selling vendor may be any vendor who may sell an item or product in a transaction, through any means, such as, for example, through the Internet or contact center, via affiliated partners, or in a brick and mortar store, and the like, and have items available for sale in a direct market embodiment. Furthermore, other parties e.g., a customer, may also have different roles in different circumstances. For example, a requesting consumer may act as a "shipping vendor", "selling vendor", "shipping company" to name a few.

Exemplary System Components:

Referring to FIG. 1, according to an exemplary embodiment a transaction coordination system 10 may connect directly, or via a network, such as for example, the Internet 50, to a consumer electronic device, 12, a selling vendor server or system 14, a shipping vendor server or system 44, and a shipping company server or system 46. In the context of the present application, the term "server" is used in a generic sense and is meant to encompass whatever system configuration or architecture the various parties to a transaction have implemented as part of their business operations. Thus, "server" includes any and all hardware, including actual servers, end-user terminals, and other related hardware, and any and all software, including inventory management software, web pages or Internet sites (including those administered by offsite ISPs), and transaction management software.

Figure 1A:
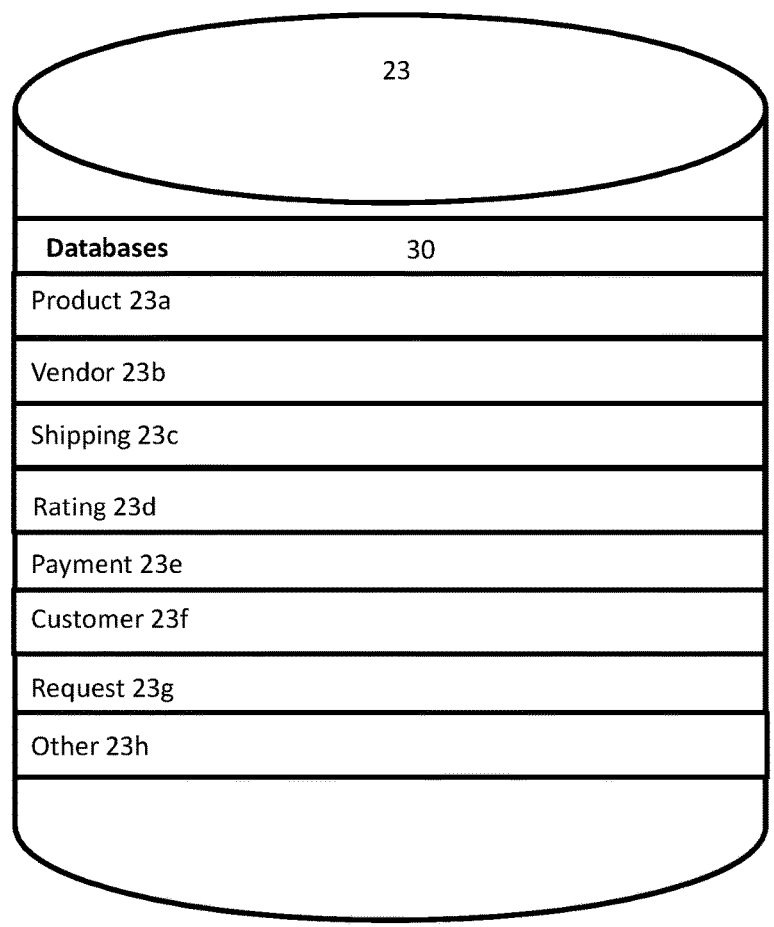
FIG. 1A is a schematic diagram of exemplary components of a database used in conjunction with an exemplary embodiment of the present disclosure.

In an exemplary embodiment, the system 10 may include various components: catalog component 22, and transaction coordinator 30. The catalog component 22 may include one or more databases 23 and a mapping engine 28. The databases may include, for example, vendor catalog 24, master catalog 26 and other suitable database. In other exemplary embodiments described herein, the system 10 may access one or more electronic databases, not shown, in lieu of or combined with the catalog sub component 22, the vendor catalog 24, the master catalog 26 and the catalog mapping engine 28 to provide vendor, product, shipping, and/or customer information. Referring to FIG. 1A, shows according to an exemplary embodiment, Databases 23 that are electronically accessible by the system 10. The databases 23 may include a Product Database 23a, Vendor Database 23b, Shipping Database 23c, Rating Database 23d, Payment Database 23e, Customer Database 23f, Request Database 23g, and another or Other Database 23h, for any other type of information. These electronic database(s) may be stored locally within the system 10, or may be located remote to the system 10, and accessible through a network connection, such as for example the Internet 50.

The Product Database 23a may include information such as product names, product descriptions, UPC codes, product buying and selling prices, product availability (i.e., quantity in stock), and stock keeping unit numbers (SKUs). The Vendor Database 23b may include information regarding vendors, whether or not affiliated with the system 10, including location, vendor preferences, store locations, products sold by vendor and any other information used by the system 10 to implement one or more embodiments described herein. The Shipping Database 23c may include information relating to shipping companies, their shipping rates, service type and availability, shipping capabilities, their contact information, preferences with respect to the system 10, any other information used by the system 10 to implement one or more embodiments described herein. The Rating Database 23d may include reputation or other related information regarding shippers, vendors, products, customers, and the like. The information may be used by the system 10 to determine the service quality and/or reliability of one or more parties according to embodiments herein. The Payment Database 23e may include the financial information regarding the system 10 with respect to one or more parties, such as customers, vendors, shipping companies, and the like. The financial information may include payment information, and financial accounts that may be used by the Payment Manager to implement/settle transactions with one or more parties as described in embodiments herein. The Customer Database 23f may include information regarding one or more customers that may be utilize the system 10. The information may include name, address, customer preferences, contact information, and any other information used by the system 10 to implement one or more embodiments described herein. The Request Database 23g may include information regarding requests and/or queries received by the system 10, such as, for example, requests/queries relating to order information, order interest information, and/or shipping information, to name a few. While FIG. 1A represents the sub-Databases, 23a-h as being discrete and or separated, the Database(s) 23 may be stored together or separately on one or more computer readable storage media, in any suitable way.

Figure 1B:
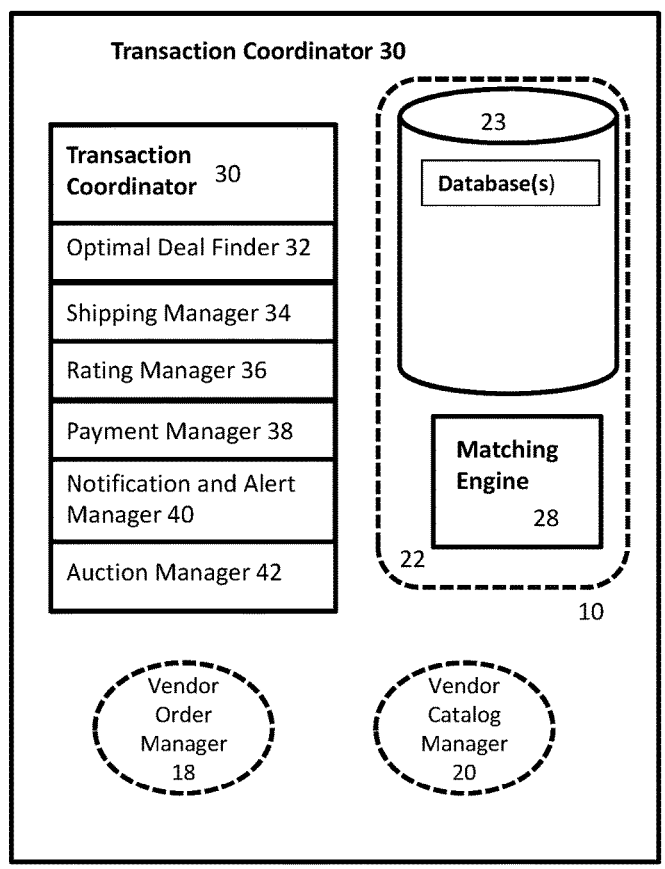
FIG. 1B is a transaction coordinator according to an exemplary embodiment of the present disclosure.

Referring to FIG. 1B, the transaction coordinator 30 may include basic components or modules, such as, for example, optimal deal finder 32, shipping manager 34, rating manager 36, payment manager 38, notification and alert manager 40, and auction manager 42. The various components of the system 10 are discussed in greater detail below. In an exemplary embodiment, the transaction coordinator may include one or more components from the catalog component, such as the matching engine and/or the databases 23.

In exemplary embodiments, a transaction may be initiated in response to a consumer/customer who, using an electronic device, such as for example, computer terminal 12, and has accessed a vendor's website seeking to purchase a particular product or products. For example, a customer may access the vendor's website directly or indirectly via syndicated content/listing on a website belonging to a partner of the vendor such as an affiliate, advertising network, or ecommerce marketplace, for example. While at the vendor's website, a consumer may select at least one product that he or she wishes to purchase, and may place an order with the vendor for the selected product(s) at the prices stated on the website. The consumer may select a delivery option and pay for the merchandise by entering a credit card number or any other suitable payment method, such as, for example, mobile payment system, Google Wallet, PayPal, gift card, and the like. Thus, selling vendor system 10 14 may receive the consumer's payment information or other proof of payment or payment assurance before the order is actually processed.

The order placed by the consumer may be received by the selling vendor system 14 (directly or indirectly) where it is processed. However, rather than simply processing the order and shipping the merchandise to the customer, the selling vendor's server may be configured to automatically query the system 10 in an attempt to "optimize" this particular transaction. It is to be appreciated that in some embodiments, a vendor system may not belong to the identified vendor who is participating in the transaction, but a partner of the selling vendor or a third-party. For example, eBay and Amazon.com marketplaces provides the hardware and software to enable other third-party vendors to sell their merchandise using their platform. Furthermore, a vendor may also rely on other third parties for services such as storing products in a third-party warehouse. For example, a third-party may own and operate one or more shared warehouses to allow one or more vendors to store their products therein, such as, for example Fulfillment by Amazon (FBA), GSI Commerce, or ShopRunner. For purposes of this disclosure, a vendor system may refer to not only the hardware/software associated with a given vendor, but the also the system/hardware/software associated with one or more partners of the vendor and/or other third-parties working with the given vendor.

In the context of the present application, the term "optimize" refers to the system's ability to examine a number of available options, and based on the nature of the query itself, select an option that appears to be advantageous to one or more of the parties involved in the transaction, whether it be the selling vendor, shipping vendor, consumer, shipping carriers, the system 10, value chain participants, or any combination thereof. In other words, the system 10 may optimize one or more transactions from one or more parties perspectives, based on one or more factors, such as costs/payments, delivery time frames, inventories of one or more vendors, vendor or shipping preferences, rating/reputation of one or more parties, social connection/relationship between one or more parties, and the like. For example, in one exemplary embodiment, the system 10 may implement or optimize a transaction to minimize the time to deliver a product to a consumer while also maximizing profit for one or more parties involved in the transaction, such as for example, a vendor or carrier, involved in the transaction. These and other similar factors to be optimized may be weighted according to parties involved in the transaction. For example, the system 10 may be more closely affiliated with one or more vendors/carriers, and the system 10 may be implemented to minimize cost and/or minimize payment to those affiliated parties. In some exemplary embodiments, the system 10 may minimize costs/payments to all parties equally. In other exemplary embodiments, the system 10 may maximize sales and exposure, such as, for example, in a loss leader situation, with respect to one or more vendors.

In exemplary embodiments, one or more of the vendors and/or carriers involved in the transaction may, indicate to the system 10 through any suitable means, their preferences, restrictions, and/or limits with respect to optimizing one or more factors involved in a transaction coordination process.

As discussed, the transaction coordination system 10 or "hub" may provide both an extensive database of product related information and a sophisticated transaction coordination sub-component that examines potential shipping vendors and ranks these shipping vendors based on the nature of the query submitted to the hub by the selling vendor. Thus, the hub may include a data related to various vendors and the products they offer for sale, and may include one or more software modules that process this data in correlation with additional information, such as shipping costs, and perform a qualitative and quantitative analysis concerning suitable or "optimal" transaction partners.

Referring back to FIG. 1, the vendor catalog manager 20 may be a software module that resides in the catalog subcomponent 22 and/or on a vendor's system. The vendor catalog manager may interface with vendor in order to receive and store new or different product data, such as for example, in one or more of the vendor catalogs and/or any other electronically accessible database(s). The vendor catalog manager 20 may be used by the various vendors to change, edit, and update all product information already stored in one or more electronically accessible databases, such as, for example, vendor catalogs.

For a vendor that is part of or is affiliated with the transaction coordination system 10, the system may maintain and/or have access to one or more databases of product information and may include information that is vendor specific. The one or more databases may be referred to as a "vendor catalog" and may include current and accurate information related to the products that each vendor has available for sale. The affiliated vendors may be responsible for submitting, updating, and maintaining the information in their respective vendor catalogs either manually or through automated means. In some exemplary embodiments, the system 10 may be responsible for maintenance of the vendor catalogs through manual or automated means. Information included in the vendor catalogs may include, but is not limited to, product names, product descriptions, UPC codes, product buying and selling prices, product availability (i.e., quantity in stock), product warehouse location(s), and stock keeping unit numbers (SKUs). This information may be vendor-specific, meaning that different vendors may provide different product information for the same products.

In an exemplary embodiment, the master catalog 26 may include a comprehensive or global database that is the primary source of information utilized by the transaction coordinator 30. The master catalog 26 may include a global list of all of the products carried by all of the vendors, whether selling, shipping, or both, that are participating in the system of the present application. The master catalog 26 may also include, but is not limited to, product information such as weight, manufacturer's suggested retail price, median vendor price, and other information about each vendor that may affect each vendor's likelihood of being chosen as a possible collaborator. Thus, the master catalog 26 may provide a highly detailed, standardized list of all of the products available to consumers at any given time and provides the basis for transaction coordinator 30 to determine optimal transactions given a certain set of starting parameters selected by the selling vendor who receives the original order from the consumer.

The master catalog 26 may be configured and maintained in either a centralized or decentralized fashion. In some embodiments, the master catalog may be embodied using semantic web constructs. In some exemplary embodiments, the system 10 may not have a master catalog and instead receive comparable and/or the same information described with respect to the master catalog 26 from one or more sources, such as the vendors themselves.

Master catalog 26 may also include additional storage for auxiliary information that links products to other products or links other types of information to products. For instance, the master catalog may contain a link between a product "baseball bat" and another product "baseball glove." Customers who purchase one of the items may potentially be interested in the other. The transaction coordination system 10 may utilize this information to provide customer incentives or otherwise raise interest in a particular product.

Other auxiliary information may be stored in master catalog 26, such as product advertisements and discount coupons. One possible use of this information relates to displaying such advertisements or customer incentives on a selling vendor's website or on one or more third party partner web sites. Advertisements that are linked to a particular product are related to that item and thus more likely to draw the attention of the consumer. The system 10 may collect revenue from advertisers which it may then share with one or more parties involved in a transaction. The advertisements may be linked to the optimization process. For example, one or more advertisements may be linked to optimizing one or more aspects of an online transaction experience, and may be directed to consumers, vendors, shipping carriers, and the like. For example, an advertisement may be linked to enabling faster delivery of one or more products, to savings related to delivery of one or more products, and the like.

In an exemplary embodiment, the system 10 may be enrolled in one or more third-party advertising programs, such as Google Adsense, Google Adwords, AdMob, Yahoo! Search Marketing, and the like. The system 10 may store in the master catalog 26, or any other suitable electronic database, information regarding effectiveness and results of the advertising.

In an exemplary embodiment, the system 10, may include catalog mapping engine 28 which may serve as a data interface between the Database(s) 23 e.g., Product Database 23a, Vendor 23b, vendor catalogs, the master catalog, and the like. This interface may process information retrieved from vendors, and may map the information to one or more databases, such as the master catalog 26, or any other database described within. The mapping engine may receive the information from the source, such as, a vendor system 14, or may process and map the information from stored information, such as various vendor catalogs. The data stored and mapped in the master catalog 26 and/or any other of the Databases 23 may be converted into a standard, uniform format that includes universally accepted identifiers for a particular product. For example, for any given product, the master catalog or any other Databases 23, may provide a means for standardizing different SKU numbers utilized by different vendors. Any of the Databases 23, including the master catalog 26 may standardize different UPC ("Universal Product Code") numbers utilized by different vendors.

It is to be appreciated that the vendor catalogs and the master catalog may be implemented in a plurality of different configurations, manners or arrangements while being able to implement the features and processes described herein. In general, any information, regarding the vendors, products, shipping carriers, and the like, may be stored in a variety of different data structures in one or more databases that are accessible by the system 10 in order to carry out one or more embodiments described herein. For example, the information associated with the vendor catalogs and/or master catalogs may be implemented simply as one or a plurality of databases within the transaction coordination system 10. In some embodiments, the master catalog 26 and vendor catalogs maybe implemented may not be separated and the information may be grouped together in one or more data structures. For example, one or more databases may have data entries of products that may also contain information specific to each the product as well as the one or more vendors associated with selling each product in the entry.

The vendors that utilize the system of the present application may not communicate with one another concerning a particular transaction. In an exemplary embodiment, one or more parties and/or vendors may openly communicate with "trusted" parties. For example, one or more parties may belong to a private network. The system 10 may allow one or more parties to form private networks so that such members of a private network may directly and/or openly communicate with one another. In some embodiments, one or more parties may designate one or more trust preferences with respect to one or more other parties for purposes of facilitating transactions.

In an exemplary embodiment, the transaction coordinator 30 may automatically and anonymous select the parties to the transaction, such as, for example the vendors (i.e. a shipping vendor and a selling vendor), one or more shipping carriers, and the like. As described in greater detail below, after transaction processing has been initiated, the transaction coordinator 30 may seek product information first from the selling vendor's catalog and then compares that data against the information found in the master catalog. The mapping engine 28 may provide the means by which this information can be accurately compared and processed because it has effectively translated the selling vendor's product information into a common language" used by the master catalog without direct communication between the selling vendor and the shipping vendor being necessary.

In exemplary embodiments, the transaction coordinator 30 may be implemented as a system subcomponent that may search for, rank, and identify optimal transaction partners. In the exemplary embodiment shown in FIG. 1B, the transaction coordinator 30 may include one or more software modules that may communicate with one another and the catalog subcomponent 22 to identify "optimal" transaction partners.

Figure 1C:
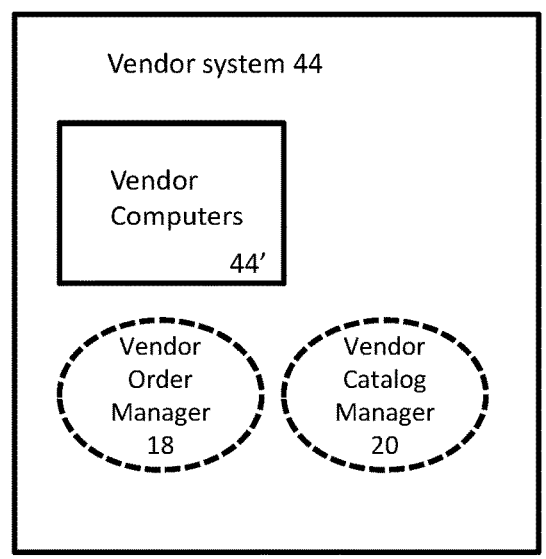
FIG. 1C is a vendor system according to an exemplary embodiment of the present disclosure.

Referring to FIG. 1B and FIG. 1C, according to exemplary embodiments, the vendor order manager 18 may be a software module residing within the transaction coordinator 30 and/or on a vendor's server, 14, 44. The vendor order manager may provide the means by for vendors, such as, for example, vendors that are affiliated and/or part of the system to query the system 10 so that the system 10 will identify one or more transaction partners. The vendor order manager 18 may gather the sales order, order interest, and/or shipping information from vendor server 14, format it, and submit it to the transaction coordination system 10 for processing. In some exemplary embodiments, one or more modules similar to the vendor order manager may be associated with other non-vendor parties (e.g., value chain player, customer, shipping company, etc.) and may perform one or more of the functions or similar functions associated with the vendor order manager (e.g. gather and transmitting order information, order interest information, etc. to the system 10) with respect to that non-vendor party.

In exemplary embodiments, the optimal deal finder 32 may be a software module residing within transaction coordinator 30. The optimal deal finder may receive sales order information from the vendor order manager 18 and may execute optimization and coordination analyses. The optimal deal finder 32 may query both the catalog subcomponent 22 and/or a number of other software modules residing within transaction coordinator 30. The other software modules that may be queried by optimal deal finder 32 may include shipping manager 34, vendor rating manager 36, payment manager 38, notification and alert manager 40, and auction manager 42.

In exemplary embodiments, the shipping manager 34 may be a software module residing within transaction coordinator 30. The shipping manager 34 may periodically or continually accesses shipping company server or system 46 for data concerning shipping rates, schedules, delivery options, and other information. The information accessed by shipping manager 34 may be used by optimal deal finder 32 as part of the transaction coordination process carried out by the system of the present application. The shipping manager 34 may also track one or more particular products throughout the delivery process to check that one or more consumers receives their product(s), or that it has reached a shipping vendor in the case of a merchandise return or inventory replenishment.

In exemplary embodiments, the vendor rating manager 36 may be a software module residing within transaction coordinator 30. The vendor rating manager may processes data found in the master catalog 26 or found any other accessible database or source, such as, for example, Better Business Bureau (BBB), Dun and Bradstreet (D&B), Hoovers, LexisNexis, eBay, Amazon, and the like concerning the performance characteristics of one or more vendors. Over time, the ongoing process of order fulfillment accomplished by transaction coordination system 10 may result in some vendors achieving greater efficiency and consistency than other vendors. Such desirable characteristics are may be quantified by the vendor rating manager 36 and may be stored in the master catalog 26 or any other accessible database(s). This data may be accessed by the vendor rating manager 36 each time the transaction coordination system 10 is queried. As discussed below, the information processed by vendor rating manager 36 may be used in different ways, such as, for example, to form the basis of an endorsement or certification aspect of the present application. The vendor rating manager 36 may access other data to determine endorsements and/or certifications, such as, for example, trusted third-party data provided by credit agencies, the Better Business Bureau, eBay and Amazon Seller Ratings and Reviews, to name a few.

In addition, the system 10 may have access to additional ratings/reputation information, such as, for example rating information regarding more customer, shipping carriers, and the like. Such information may be stored locally, such as the Ratings Database 23d, and/or may be maintained remotely from the system 10. This additional rating information may also be used by the optimal deal finder in a transaction coordination process.

In exemplary embodiments, the payment manager 38 may be a software module residing within transaction coordinator 30. The payment manager may manage and track the payments made to the transaction coordination system 10 by selling vendors, customers, and other parties and the payments made by the transaction coordination system 10 to shipping vendors, customers, shipping companies and other parties. The payment manager 38 may also manage the charging and collection of commissions/fees that the transaction coordination system 10 charges for completed transactions. The payment manager 38 may implement and use any suitable payment processing system, such as for example, systems relating or involving debit cards, credit cards, prepaid cards, Facebook credits, Automated Clearing Houses (ACH), PayPal, mobile wallet systems, stored value cards, gift cards, other forms of ecommerce credit/payment systems, and the like.

The transaction coordination system 10, may require one or more of the parties using the system 10 involved in the optimization to provide financial information and/or register any suitable financial account with the transaction coordination system 10. The transaction system 10 may charge a commission/fee directly via these registered financial accounts. The system 10 may charge the commission immediately or after a transaction has been completed.

Other payment structures may be realized in conjunction with the systems and methods described herein. In an exemplary embodiment, the system 10 may allow one or more parties to subscribe for the service(s) provided by the system 10, e.g., the transaction optimization service, for a fee that may be charged monthly, semi-annually, annually, and the like.

The system 10 may charge a flat fee per use, or a subscription fee, or may also offer discounts based on order volume associated with one or more parties that use the transaction coordination system 10. In some exemplary embodiments, a party, such as a consumer, vendor, and the like may have a standing order (such as prescription drugs, etc.), or a order that is bought, and/or shipped at repeat intervals. Such a party may be charged a fee for the system 10 to optimize orders with respect to just the standing order.

In exemplary embodiments, the notification and alert manager 40 may be a software module residing within transaction coordinator 30. The notification and alert manager may broadcast information, such as the potential for a transaction, to the various parties at certain times, using multiple means of communication such as, for example, email, fax, instant messaging, text messaging, cellular paging, blog post, and the like. In exemplary embodiments, the auction manager 42 may be a software module residing within transaction coordinator 30. The auction manager 42 may create and manage auctions (open, close bid, reverse) for certain transactions. See Example 5 for further discussion of an order auction.

As stated above, a shipping vendor may be any vendor that the system 10 identifies as a vendor that can ship a product to a consumer for a given transaction. In exemplary embodiments, one or more shipping vendors may be identified by the system 10 through an optimization query that uses one or more parameters that may be defined by one or more parties. For example, a shipping vendor may be able to ship the product to the customer faster than another selling vendor. In another example, a shipping vendor may be able to ship a product to a customer at a price that is lower than that of a selling vendor for shipping the same product. Once a shipping vendor has been accepted by a selling vendor, the vendor order manager 18 communicates with shipping vendor server or system 44 to coordinate the pickup and delivery of the product to the consumer.

The shipping company server or system 46 may communicate with the system 10 by means of the shipping manager 34. The shipping company server 46 may provide updated information to the transaction coordinator 30 and also may provide the information necessary for shipping manager 34 to generate labels that the shipping vendor may place on the items that are delivered by the shipping company.

Figure 2A:
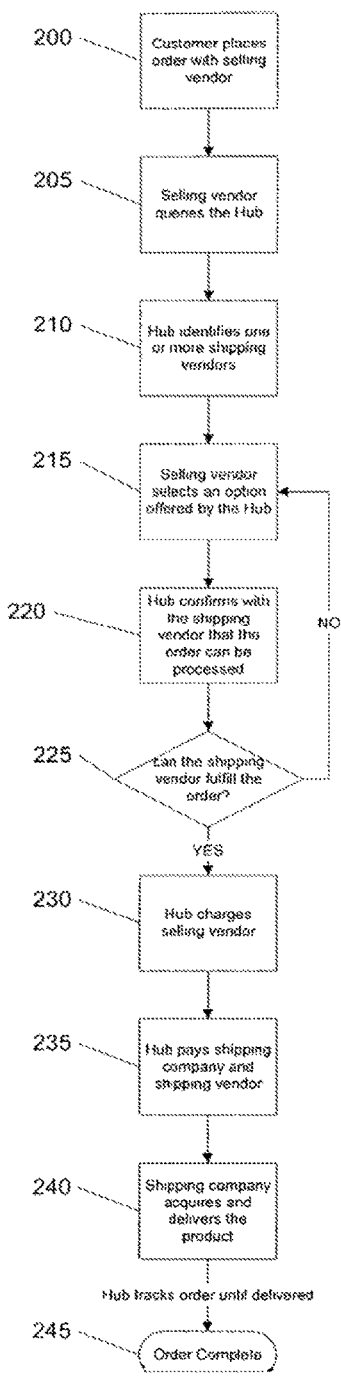
FIG. 2A is a flow chart illustrating a transaction relating to an transaction coordination system according to an exemplary embodiment of the present disclosure.

Exemplary System Operation:

FIG. 2A shows, according to an exemplary embodiment, a general overview a transaction process through the transaction coordination system 10 that may occur as follows: (i) a consumer places order with a vendor in step 200; (ii) a vendor accepts the order and queries the system 10 in step 205; (iii) the system 10 processes the order and identifies one or more shipping vendors in step 210; (iv) the selling vendor selects one of the shipping vendor options presented by hub 16 in step 215; (v) the system 10 confirms with the selected shipping vendor that the order can be fulfilled by that shipping vendor in step 220 (if no, the selling vendor selects another shipping vendor; if yes the transaction proceeds as shown in decision block 225); (vi) the system 10 charges the selling vendor the hub buying price (see below) in step 230; (vii) the hub pays the shipping vendor the hub selling price (see below) and pays the shipping company the cost of shipping the product in step 235; and (viii) the shipping company acquires the product from the shipping vendor and delivers it to the consumer in step 240. The shipping manager 34 tracks the order until the product has been delivered at which point the order is complete as shown in end block 245. It should be recognized that in some cases it is possible that the shipping vendor may directly pay the shipping company and that the hub selling price may be inclusive of the shipping costs.

Figure 2B:
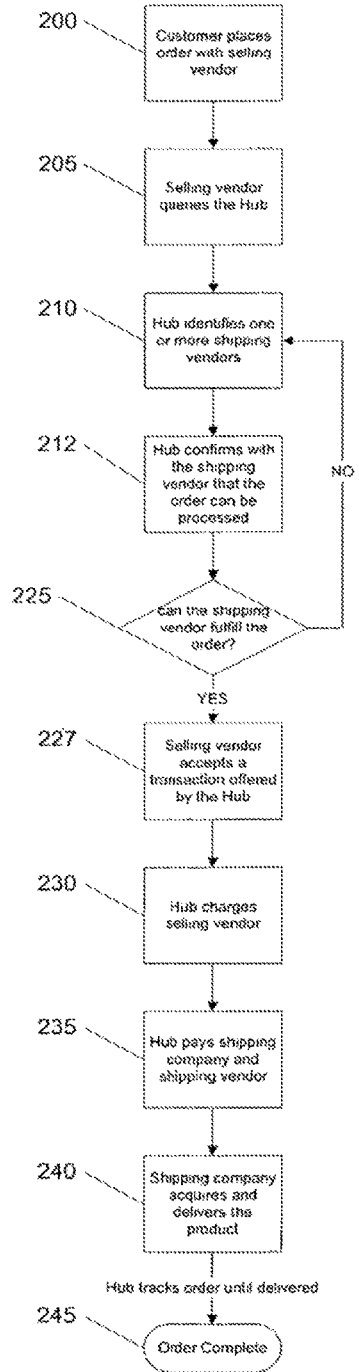
FIG. 2B is a flow chart illustrating a transaction relating to an automated transaction coordinator according to an exemplary embodiment of the present disclosure.

FIG. 2B shows, according to an exemplary embodiment, a transaction process through transaction coordination system 10 that may occur as follows: (i) the consumer places order with selling vendor in step 200; (ii) the selling vendor accepts the order and queries the system 10 in step 205; (iii) the system 10 processes the order and identifies one or more shipping vendors in step 210; (iv) the system 10 confirms with the selected shipping vendor that the order can be fulfilled by that shipping vendor in step 212 (if no, the hub identifies another shipping vendor as shown in decision block 225); (v) if yes, the selling vendor accepts the transaction offered by hub 16 in step 227; (vi) the system 10 charges the selling vendor the hub buying price (see below) in step 230; (vii) the hub pays the shipping vendor the hub selling price (see below) and pays the shipping company the cost of shipping the product in step 235; and (viii) the shipping company acquires the product from the shipping vendor and delivers it to the consumer in step 240. The shipping manager 34 tracks the order until the product has been delivered at which point the order is complete as shown in end block 245.

In an exemplary embodiment, one or more transactions may begin with a consumer or customer accessing a vendor's website by means of the Internet, usually from a computer terminal located in the home or office. It is important to note that the present application is not limited to Internet-based transactions, and in other embodiments, the transaction may be based on catalog purchases or purchases based on other forms of direct marketing that are conducted over the telephone or by other means. The next step in the typical Internet-based transaction involves the consumer browsing selling vendor website and selecting one or more items for purchase.

After the consumer has selected the product or products that they wish to purchase, the consumer may place an order on selling vendor website and submits certain relevant customer information. This customer information may include payment information, such as, for example, a credit card number, debit card number, PayPal Account, and the like and may include a delivery destination for the products (in one embodiment, only a ZIP or postal code may be used for transaction optimization). The customer may also select a time period for delivery such as "next day air," "second day air," "five-day ground," etc. based on the options that are presented to the consumer at selling vendor website. In one exemplary embodiment, after the payment information is verified by the selling vendor, processing of the order may begin. In other embodiments, the verification and order processing functions may occur simultaneously.

A step in the order processing stage of the transaction, may include querying the transaction coordination system 10 concerning optimization and coordination of the transaction. Once the query is underway, the process of order fulfillment may include the step of selecting an optimal transaction partner, i.e., "transaction optimization,". After an optimal partner has been identified and accepted, and the next step of coordinating the transaction, i.e., "transaction coordination."

Figure 3:
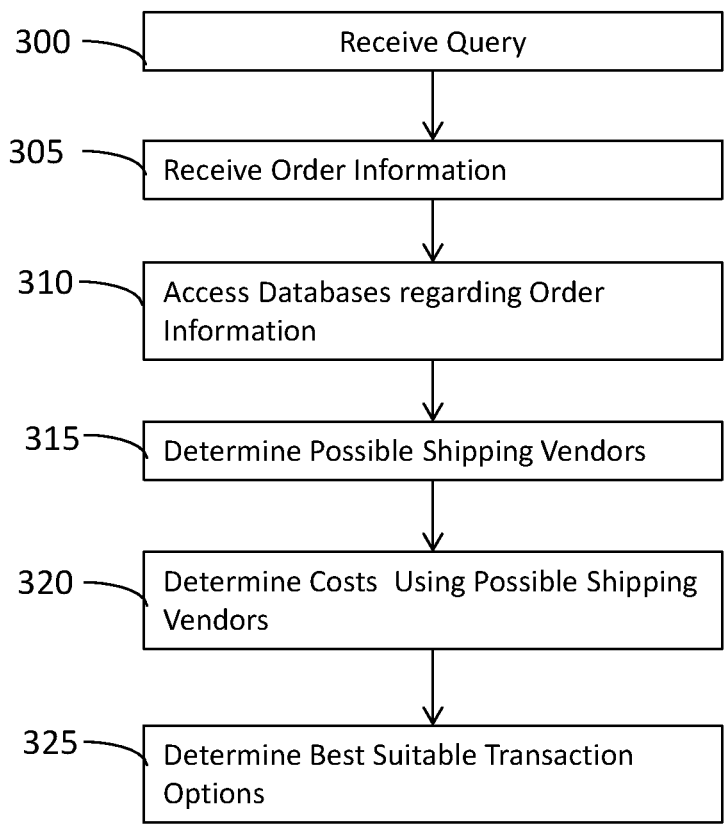
FIG. 3 is a flow chart illustrating a transaction optimization process according to an exemplary embodiment of the present disclosure.

Exemplary Transaction Optimization:

FIG. 3, shows, according to an exemplary embodiment, a process of determining transaction optimization matches as accomplished by the transaction coordination system 10. For example, a vendor who has just had a customer place an order may seek to realize savings by using the transaction coordination system 10 to optimize a transaction using another vendor. FIG. 3 shows the process of the transaction coordination system 10 determining possible optimization matches on behalf of vendors that are affiliated with the system 10. Specifically, a first vendor, a selling vendor may complete a sale of a product, but a second vendor, or shipping vendor may actually ship the product to the ordering customer.

In an exemplary embodiment, the transaction coordination system 10 may receive a query or request to optimize an order, from a vendor, 300. The query may be received from a selling vendor, such as from, for example, a selling vendor system 14. The query may be transmitted by, from a vendor system 14, as shown in FIG. 1C. For example, the query or optimization request may be transmitted via one or more vendor computers 44', associated with the vendor system 14. The vendor computers 44' may be operatively connected to a network, such as the Internet, in order to transmit the query and other need information to the system 10. Along with the query/request, the selling vendor may provide any preferences or restrictions with regards to having a transaction optimized. For example, the selling vendor may restrict the possible shipping vendors to be used, or require a certain savings advantage, and other relevant preference.

The system 10, and/or transaction coordinator 30 may receive with, or separately with the query, order information and/or shipping notification information associated with the query/request, 305. For example, a vendor who has transacted an order with a customer, may forward the order and/or shipping notification information to the via the vendor system 10. The order information may include information regarding one or more products in the order. For example, after an online order has been placed, an order confirmation email may be sent. Later, when the order has or is about to ship, a subsequent email may be sent with the shipment information. In some embodiments, the system 10 may require one or both of these pieces of information, order or shipping notification information to be sent to the system 10.

The system 10, and/or transaction coordinator may use the order information to access information from one or more databases, 315. For example, the system 10 may access information from the Databases 23 based on the product information, shipment information, vendor information, and the like. The system 10, may use the information accessed to identify one or more shipping vendors that may be used to in a transaction optimization. For example, if the order placed with the selling vendor involves a specific product, the system 10 may access the Databases 23, such as the Product Database 23*a*, and/or the Vendor Database 23*b* to determine vendors, (shipping vendors) that also sell that product. The vendors identified may not only sell the specific product, but also be identified as having available stock of the specific product.

In an exemplary embodiment, the transaction coordination system 10 may determine the costs in using the one or more identified shipping vendors to ship a product, 320. The cost may include product buy price, product sell price, commission/fee, sales tax, shipping cost, and other cost associated with using the vendor. This analyses may be accomplished using one or more software modules associated with the transaction coordinator 30, such as, for example, the optimal deal finder 32. After determining the costs of using one or more shipping vendors, the system 10 may consider which vendors are the best suited to ship the order on behalf of the selling vendor, 325. This determination may not be based on cost alone, but also other factors including delivery time, vendor reputation, inventory, and other factors in addition to cost. For example, the optimal deal finder 32 may utilize the Rating Manager 36, and access rating information, such as in the Rating 23*d* database to determine the reliability of a possible shipping vendor. The optimal deal finder may not consider shipping vendors with low ratings as suitable for a given optimization request.

Exemplary Transaction Coordination

Figure 4:
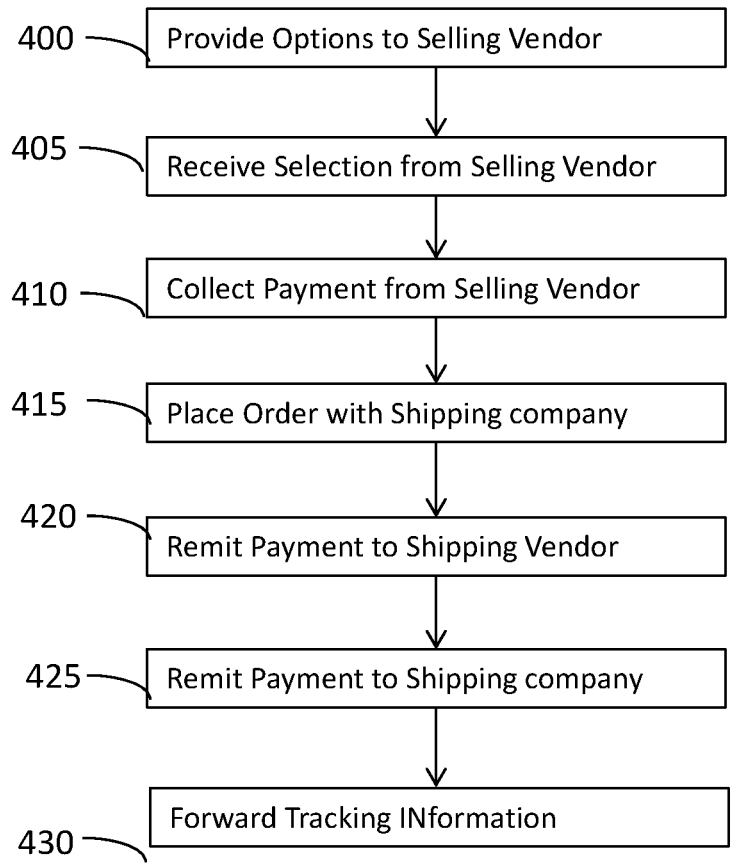
FIG. 4 is a flow chart illustrating a transaction coordination process according to an exemplary embodiment of the present disclosure.

FIG. 4, shows according to an exemplary embodiment, a process of implementing a transaction optimization match as accomplished by transaction coordination system 10. The transaction coordination system 10, according to embodiments described herein, such as FIG. 3, may have identified one or more optimization matches in response to a vendor request. The system 10, may present the matches to the selling vendor, 400. The options or matches may be presented through any suitable means, such as, for example, a web interface on a website, email, text message, blog post, fax, phone, etc. The options presented may include the costs/savings, estimated delivery timing, and may include the identity of the matching shipping vendors. For example, for each option, the system 10 may provide any rating information associated with a shipping vendor for a presented option.

In other exemplary embodiments, the selling vendor may be blind, and not know and/or not be presented the identity of the shipping vendors. The system 10, may receive a selection of a presented option from the selling vendor, 405 through any suitable means.

In an exemplary embodiment, the system 10, then may receive payment from the selling vendor, 410. For example, the system 10, using the payment manager 38, may charge a financial account associated with the requesting selling vendor. The payment amount may include the amount to be paid to the shipping vendor chosen, and may also include a commission or service fee for the transaction coordination system 10. The system 10 may then order the product from the shipping vendor, 415. For example, the transaction coordinator 30, may electronically transmit an order request with a vendor system 14 associated with the shipping vendor. The order may include the product and a requested delivery option according to the option selected by the selling vendor. After or in conjunction with ordering, the system 10 may also pay the shipping vendor, 420. The system 10, using the Payment Manager 38, may submit a payment to a financial account associated with the shipping vendor.

After payment or payment assurance is secured, the system 10 may forward the shipment tracking information to the customer. The information may be transmitted to the selling vendor to transmit to the customer, or the system 10 may transmit the information directly to the customer.

In an exemplary embodiment, "purchase price" may refer to the amount the consumer pays for the product that they have purchased from the selling vendor's website. This amount may include the selling vendor's price for the merchandise plus the cost for shipping the goods to the final destination chosen by the consumer. The cost for shipping the goods to their final destination may vary depending on the delivery option chosen by the consumer, and is may be determined by the selling vendor (which implies it may be different than the cost demanded by the shipping company to deliver the product, typically including "handling charges", subsidies, etc.).

In an exemplary embodiment, the "hub buying price" may refer to the actual amount that a selling vendor pays the system 10 for a particular product to execute a particular transaction. Because the selling vendor is not actually delivering a product from its own inventory, the selling vendor must "buy" the merchandise from the hub (and indirectly from another vendor that is identified by the hub as a possible shipping vendor). Thus, the hub buying price may reflect the amount that the selling vendor is willing to pay to, have the hub (i.e., another vendor) deliver the merchandise to the consumer. A portion of the commission charged by the system 10 to optimize and coordinate the transaction may also be included in the hub buying price, as well as the shipping cost the shipping company may charge to transport the goods from the shipping vendor to the customer. The actual cost of shipping the goods to the consumer may be calculated by transaction coordinator 30 based on data obtained from the shipping companies utilized by the system 10.

In an exemplary embodiment, the "hub selling price" may refer to the actual amount at which a shipping vendor agrees to "sell" its goods to the system 10 to participate in a particular transaction. Because the shipping vendor does not actually receive the original order from the consumer, the shipping vendor must be willing to sell merchandise from its inventory to the system 10 so that the transaction can be executed.

In an exemplary embodiment, the "actual shipping cost" may refer to the actual amount that a shipping company such as UPS, USPS or Federal Express may charge the shipping vendor to deliver merchandise to a particular destination. This amount can be calculated by the transaction coordinator 30 based on current information obtained by shipping manager 34 from shipping vendor server or system 46. The calculated amount is typically added to the amount that the selling vendor pays for the transaction, and the combined amounts equal the hub buying price. The dynamic aspect of shipping costs can promote competition among shipping companies, such as through an auction, for example. The system's 10 aggregated demand enables certain economies of scale which may not be achieved by small groups or single vendors.

In an exemplary embodiment, the "commission" may refer to the amount charged by the system 10 to the one or more of the parties involved in any particular transaction. In some embodiments, the commission may be a fixed amount, while in other embodiments, the commission charged to the parties may be based on the amount of savings that the system 10 is able to generate based on the variables involved in coordinating a transaction. It should be noted that the hub may operate using parameters that provide savings which are not strictly computed in monetary terms, such as increased customer loyalty and increased customer satisfaction, for example.

A selling vendor's query of the system 10 may occur in several ways based on the embodiment of the present application that is being utilized by the selling vendor. For example, the selling vendor may query the system 10 in real time, such as, for example, querying before the customer order is accepted and/or querying once the consumer's order has been accepted, to identify an optimal shipping vendor. The system 10 may execute a transactional analysis and immediately provide a selling vendor with options regarding shipping vendors. Based on the analysis of the system 10 in this type of scenario, the consumer, while they are still at the selling vendor's website, may be presented with delivery and checkout options the same as or differing from the choice they initially made when shopping and/or purchasing the product. Moreover, the options presented may be different than another party, e.g., a selling vendor, may see when requesting optimization with respect to an order. For example, convincing the consumer to select a delivery and/or checkout option presented by the system 10, may result in additional earnings for the system 10, and may by extension result in a benefit and/or savings for one or more other parties involved in the transaction option. For example, the consumer may be offered the option to receive the goods the next day at a cost lower than typical overnight shipping, but higher than regular shipping. The difference between the original (regular) shipping cost the consumer was going to pay and the new system presented shipping cost represents the additional amount gained through the transaction and may be shared between one or more parties according to any suitable distribution.

In an exemplary embodiment, a consumer's order and customer information may be accepted by the selling vendor system 14, but may be submitted to the system 10 at another time, along with other pending transactions. Thus, the selling vendor, either manually or automatically, must later decide between various possible shipping vendors identified by the system 10. The consumer is not typically consulted in this embodiment of the present application.

In an exemplary embodiment, certain purchasing or shipping options may be presented to the consumer while they are still browsing a selling vendor's website. This approach attempts to create interest in or awareness of certain products or shipping options based on known preferences or other transaction information specific to a particular consumer. Thus, this approach may utilize certain consumer information that has been acquired through the use of cookies placed on the consumer's computer or by other methods, such as geographic location of the IP address.

Regardless of the timing of the selling vendor's query of the system 10, the vendor order manager may receive the order information and/or order interest information from the selling vendor's server 14 and may query the optimal deal finder 32, which resides within the transaction coordinator 30. For example, a consumer may access a webpage associated with the selling vendor's website that displays one or more products for sale. Order interest information or product information associated with one or more products that the consumer has shown some interest in purchasing may be sent to the vendor's system 14 or directly to the transaction coordination system 10 to begin a query with the optimal deal finder, for example, before the consumer has started a transaction process (e.g. online checkout). For example, order interest may be an interest (not a commitment) in purchasing one or more products and may optionally include ancillary information like customer payment, billing and shipping address. In exemplary embodiments, order interest queries may originate directly from a selling vendor's website in real-time, for example, from a product list or details page, shopping cart (active or abandoned) or at any step during the checkout process. In some embodiments, order interest queries may originate directly from and end-customer. such as a customer who may scan a barcode of a product using say a mobile device while shopping at a local retail store.

In other exemplary embodiments, product information may be sent after a consumer has added a product to a shopping cart, or may be sent during the transaction checkout process. In exemplary embodiments, additional information may also be sent to the system 10, such as information regarding the consumer. For example, separately or with the product information, the consumer information, such as geographic, demographic information, address, and the like may also be sent to the system 10 as part of the query.

The optimal deal finder 32 may then access the selling vendor's catalog 24 so that information about a particular product or products may be obtained. The vendor catalog 24 in turn may access the master catalog 26 to gather information about all other vendors in the system that carry the same product or products.

The transaction coordination system 10 may handle situations where an order or order interest information may contain more than a single product. In such cases, the optimal deal finder 32 may identify multiple vendors that can optimize the transaction (each for one or more of the different products in the original order, or for partial quantities of the same product). Even if the same shipping vendor is identified for all products, it may be that the items need to be shipped as separate packages, as is the case for products of substantial volume or weight.

The optimal deal finder 32 may address these situations by "splitting" each order into several transactions with one product each, and attempting to optimize these transactions individually. The optimal deal finder 32 may regroup transactions that can be optimized by the same vendors, or otherwise may determine one or more optimal ways to optimize the entire group of transactions. Regrouping of transactions may be possible even in scenarios where multiple orders from different selling vendors are intended for the same end customer recipient.

After the optimal deal finder 32 has gathered the relevant product and vendor information, it may gather shipping information from the shipping manager 34. As stated above, shipping manager 34 may include software provided by one or more shipping companies and/or their partners. Preferably, the shipping companies utilized by the system 10 update their servers and systems periodically or even continuously in real-time, thereby providing up-to-date information when queried by shipping manager 34. The cost of shipping a product from a particular shipping vendor's place of business to the consumer may be a significant variable in identifying optimal transaction partners.

After the shipping information has been retrieved and processed, the optimal deal finder 32 may query the other software modules within the transaction coordinator 30 for additional quantitative or qualitative data concerning particular vendors. Based on the information and/or data retrieved and processed, the optimal deal finder 32 may select one or more shipping vendors that can optimize the transaction. Recall that in the context of the present application, "optimize" may mean that a collaboration that may provide a benefit to at least one of the parties to the transaction, e.g. one of the vendors, consumers, shipping carriers, and the like, based on one or more relevant factors to the transaction. For example, in an exemplary embodiment, the optimization may benefit both a shipping and selling vendor, that neither would have realized if the selling vendor had simply fulfilled the order itself.

In an exemplary embodiment, the identified optimal shipping vendors may be based solely on the data and and/or data retrieved and processed by the system 10. The identified shipping vendors may be presented to the selling vendor for consideration, e.g., approval or rejection. The system 10 may also identify a shipping vendor and, without any additional input from the selling vendor, for example using business rules that have been pre-configured by the selling vendor, instruct the shipping vendor to deliver the product. In this instance, the system 10 may verify the availability of the product in the shipping vendor's inventory, and does not seek explicit approval of the selling vendor before executing the transaction. This embodiment, like others, may take advantage of recursive optimization and may be useful when the entire transactional process is automated and human interaction is not required or desired.

In identifying an acceptable shipping vendor, the optimal deal finder 32 may consider both the hub buying price and the hub selling price, both of which are typically found in the vendor catalogs. So that the selling vendor may realize a profit from the transaction, the amount of the hub buying price is typically lower than the price at which the selling vendor originally sold the product to the consumer. Thus, the amount that the selling vendor is willing to pay the hub 16 to have a particular product shipped by another vendor may cover the price that the shipping vendor is demanding for the product, plus any shipping costs. Profits may be realized by the system when the Equation (1) is satisfied:

$$\text{Hub Buying Price} \geq \text{Hub Selling Price} + \text{Shipping Cost} \quad \text{Equation (1)}$$

The transaction coordinator 30 may also consider a number of other factors when selecting optimum transaction partners for the selling vendor that has submitted a query to the system 10. Such other factors may include, but is not limited to, return policies, product availability, and the past performance of particular vendors. Past performance measures or ranking may be included in the Ratings Manager.

As a byproduct of processing numerous transactions, the system 10 may develop a large working network of vendors. It is possible that a transaction arranged by the system may involve more than two vendors (selling and shipping vendors). The following example is illustrative of this scenario.

A vendor located in California (CA) has fulfilled a number of orders on behalf of a vendor located in Connecticut (CT). A third vendor, located in Texas (TX), has fulfilled a comparable number of orders on behalf of the CT vendor. The arrangements call for the CT vendor to replenish the inventory of the CA vendor (a bulk shipment from CT to CA) and for the TX vendor to replenish the inventory of the CT vendor (a bulk shipment from TX to CT).

Rather than executing two shipments across the country, one from CT to CA and one from TX to CT, the Hub coordinates a single shipment from TX to CA, thus settling both transactions with one shipment and generating substantial savings in the process.

In order for this kind of optimization to occur, the number and kind of goods that the vendors need to settle should be equivalent. However, this is only one example of how such multi-vendor transactions may function. A large number of vendors and transaction settlements may be part of the optimization process. The system 10, having access to large amounts of data, is capable of executing multi-party transactions. Shipments to customers, shipments among vendors, and financial settlements among vendors and the system 10 may all be part of this large-scale process.

As a result of transaction optimization executed by the system 10, the goods involved in some transactions may travel reduced distances and spend less time in transit to a final destination. For valuable packages that are insured during transport, reduced travel distance and time can translate to reduced insurance premiums. The system 10 can therefore achieve additional savings in the transportation process by identifying opportunities to reduce insurance costs.

In its typical mode of operation, the system 10 optimizes transactions while keeping vendors anonymous and keeping vendor catalogs transparent to each other. However, in exemplary embodiments, the system 10 may provide vendors, customers, shipping carriers, and the like access to certain other vendor catalogs through a subscription model.

In this embodiment, vendors who operate an e-commerce website may want to offer products for sale that they do not normally carry in their inventory. For example, a vendor who sells flowers recognizes that customers frequently purchase chocolates along with flowers, but does not have the ability or interest of carrying an inventory of chocolates. For such a vendor, it may be beneficial to establish a strategic alliance with a different retailer who specializes in chocolates.

The system 10 enables such alliances through a "publish & subscribe" mechanism. Vendor catalogs can optionally be "published," with or without the knowledge of the owner (i.e., publishing vendor). Once a catalog has been published through the system 10, other vendors can "subscribe" to it and gain access to the products it contains. The information can either be obtained manually or automatically displayed on the website of the subscribing vendor. Orders placed for such "subscribed" products can be manually or automatically routed through the system 10, where the order will be directed to the publishing vendor, or potentially to a different vendor that is has been identified as optimal for that particular transaction.

In exemplary embodiments, parties using the system 10, such as, for example, customers, shipping companies, selling vendors and shipping vendors have little or no contact with one another. Anonymity may be a concern from the hub administrator's perspective because if vendors learn of each other, they may seek to collaborate without utilizing the system of the present application. Some selling vendors may not wish for certain shipping vendors to have access to certain customer information, so in essence all that the system 10 and/or the Payment Manager 38 may utilize to process an order is a credit card number and a zip code. Furthermore, the transaction coordination process may be transparent to the consumer, who is unaware that the product they order has been delivered from a vendor that is not the vendor that originally received the consumer's order. This transparency may be facilitated by the system 10 to generate shipping labels that include only limited information related to the shipping vendor and/or customer. The customer contact information is typically hidden from the shipping vendor because the shipping vendor may utilize this information to send promotional materials and potentially try to divert the customer from the selling vendor. For similar reasons, the system's 10 operating guidelines or procedures may prohibit the shipping vendor from including any promotional materials in the package that is sent to the customer.

As with the delivery shipping costs, return shipping costs may also be reduced for transactions that are routed through the system 10. If an item was shipped from a vendor that is geographically closer to the customer than the selling vendor, the item may be sent back to the shipping vendor in the event of a return. As such, the shipping cost for the return is lower than if the item had been sent to and from the selling vendor.

Figure 5:
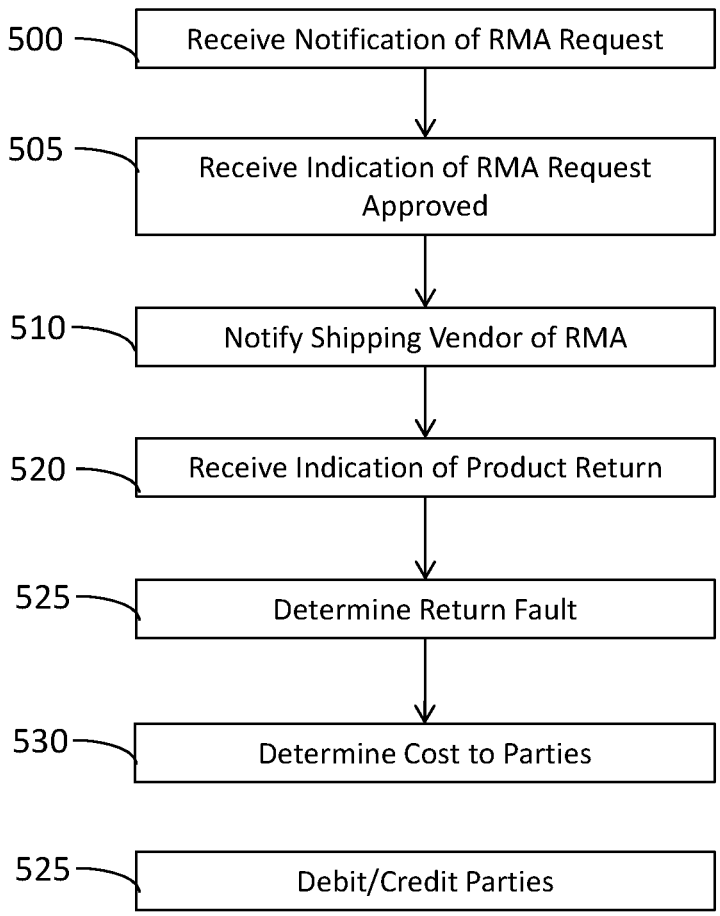
FIG. 5 is a flow chart illustrating an exemplary returned merchandise scenario according to an exemplary embodiment of the present disclosure.

Unlike regular orders processed by the system 10, where only two parties are involved (i.e., selling vendor and customer), for orders placed through the system 10 there may be two additional intermediaries, such as, for example a shipping vendor and the system 10 itself. As shown in FIG. 5, the return process may begin with the system 10 receiving a return merchandise authorization (RMA) request from a customer, 500. For example, the system 10 may receive the RMA request, either directly through a an interface. The system 10 may also receive the RMA request from a selling vendor.

The selling vendor may decide to approve or deny the RMA request (according to the policies it and/or the shipping vendor set when the sale was made). The system 10 may receive an indication that an RMA request is approved by the selling vendor, 505. In an exemplary embodiment, if an RMA request is approved, the system 10 may notify the shipping vendor of the approved RMA.

If a selling vendor approves an RMA request, an RMA number, shipping labels, and a tracking number may be issued by the selling vendor. The customer may receive these labels (either by downloading them from the hub or through the selling vendor), affixes them to the package, and provides the package to the carrier. The system 10 may automatically monitor the tracking number to identify when the package was finally shipped. Since the RMA may have an expiration date, the tracking number and shipping labels may have limited validity as well, and the customer must ship the package within an allotted time period. If shipping does not occur before timeout, the RMA may expire.

Once the package is in transit, the shipping vendor may be alerted of the pending delivery. When the package is received, the shipping vendor may inspect the returned products are in the expected condition. For example, the system 10 may receive an indication of product return, 520. The system 10, may determine the "fault" of the return. The fault information may be provided from the selling vendor and/or customer. For example, the system 10, may determine that the shipping vendor, selling vendor, or some other party to be at fault. For example, if the product was missing parts/accessories, product was damaged/broken, or an incorrect item was delivered to the customer, the fault may be attributed to the shipping vendor. If the customer ordered the wrong item, or didn't want the product anymore, such as the customer found a better price elsewhere, was unsatisfied with the product, the fault may be attributed to the selling vendor. The system 10 may determine the payment amounts for each party, 530. The payment manager 38, may credit and debit the parties, 535. For example, the system 10 may debit the shipping vendor an amount equal to the value of the return (as agreed and computed based on the return reasons and any policies that were attached to the original order, which the shipping vendor established and/or accepted by accepting the order). The selling vendor may be credited 575 an amount corresponding to computations within the system 10. The selling vendor may handle any customer refunds and the RMA.

The amounts charged from and refunded to each party involved may be based on business rules implemented within the system 10, which may take into consideration factors such as the reason for the return and the condition of the returned items, as reported by the shipping vendor. The costs may depend on the party the fault is attributed to. In most cases, it should be possible to determine these amounts automatically, while in some cases human interaction may be utilized.

In some situations, it may be more expedient for the transaction system 10 to refund a customer and/or entity that has been deprived because of product damage, shipment loss, fraud, or any other type of deficiency in the transaction process. In an exemplary embodiment, the transaction coordination system 10 may use proceeds from insurance to cover refunds.

In the course of processing and optimizing numerous transactions, the system 10 will amass a large amount of data concerning the various vendors that participate in the system of the present application. In one embodiment, the system 10 may utilize this data to build expertise and compute industry averages, statistics and other useful measures for assessing the quality of a particular vendor's business practices. Such assessments of vendor performance or "reputation" are useful for creating a "vendor certification" program whereby vendors that perform at certain level based on standards created by the hub are awarded "hub certification." A seal attesting to this certification can be placed on the websites of such vendors as evidence of a high level or quality and performance. This certification program is aimed in particular at attesting that a given vendor charges reasonable amounts for shipping the goods to the consumer. Through its large amount of comparative vendor information, hub 16 may determine what amounts are reasonable. This may be either facilitated by obtaining the shipping costs directly from hub 16 in real time or through the hub's evaluation of vendor's shipping charge policies.

In addition to the transaction optimization described above, it should be recognized that the present application may be used to optimize transactions in a variety of other ways to achieve a variety of other business objectives. For example, the systems and methods of the present application may be used to accommodate same-day or other expedited delivery. As yet a further example, the present application may be used in a distributed computing environment.

Example: Urgent and Weekend/Holiday Deliveries

The systems and methods of the present application may be used to provide goods/services with reduced delivery time. There may be situations, however, in which traditional expedited delivery periods, such as second day or over-night delivery, for example, may not suffice. In such urgent or impulsive situations, a customer may need same-day critical express delivery. While same-day delivery is presently possible under certain circumstances, it is typically extremely inefficient and consequently extremely expensive.

Figure 6:
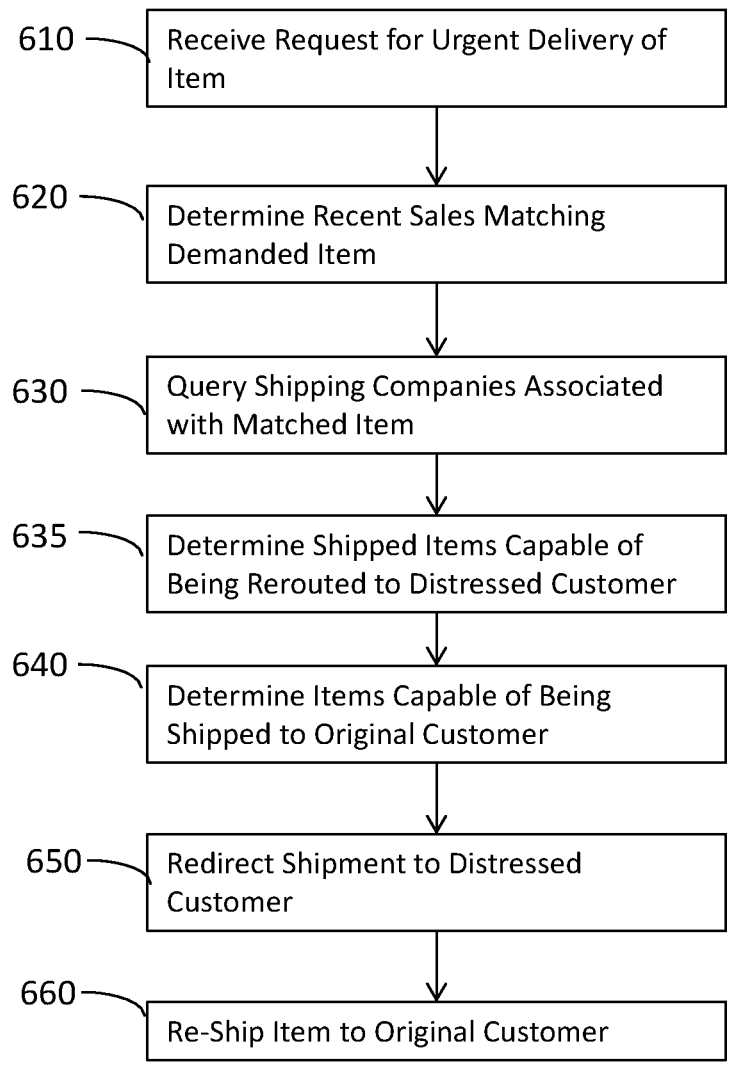
FIG. 6 is a flow chart illustrating a method for accommodating a sale and delivery of an item according to an exemplary embodiment of the present disclosure.

Referring now to FIG. 6, the systems of the present application may execute an example methodology 600 which provides a solution to such inefficiency, for example in a scenario in which a customer requests urgent or emergency delivery of a particular item. In an exemplary embodiment, the transaction coordination system 10 may receive a request for an expedited delivery of one or more items. For example, a customer may place such an order with a vendor that is participating or affiliated with the transaction coordination system 10. In other embodiments, the transaction coordination system 10 may provide means, such as, for example, an interface on a website, for a customer to directly place an urgent order. In other embodiments, the system 10 may receive a request for an order by a certain deadline, or a request for a certain item that is in high demand.

In placing the order, the customer may indicate or request an immediate or urgent delivery, delivery by certain deadline, or request for a high-demand/low supply item. The vendor may then forward the order for demanded item(s) to the transaction coordination system 10. The transaction coordination system 10 may receive a request for urgent or immediate delivery through any suitable means, as described herein, 610.

The transaction coordinator 30 may determine any recent sales of the demanded items, 620. For example, the transaction coordinator 30, may access one or more databases, such as the Master Catalog 26 or any other suitable electronic database(s), and retrieve information to determine which, if any, participating vendors are associated with selling or shipping the one or more items demanded by the customer. The transaction coordinator 30 may query an inventory control and/or monitoring system associated with the one or more of the vendors identified with selling the one or more demanded items. In exemplary embodiments, such inventory and/or monitoring systems may reside within vendor system 14, 44 or may be operatively connected to the vendor system 14, 44.

In exemplary embodiments, the transaction coordinator 30 may receive information, from one or more vendors, regarding recently sold items that match the item(s) demanded by the requesting customer. It is to be appreciated that the transaction coordinator 30 may also receive and store recent sale information from other parties, such as, value chain participants, shipping companies, other customers, to name a few. The received information may include, for example, order information, shipment package contents, carrier and delivery information. In exemplary embodiments, the transaction coordinator 30, may query one or more shipping companies associated with shipping the recently sold demanded item(s), 630. The shipping companies may transmit the required shipping and/or tracking information to the transaction coordination system 10 through any suitable means. In some embodiments, the transaction coordination system 10 may require permission to act as an agent on behalf of consumer. The system 10 may require permission in any suitable form, such as, for example, a power of attorney, a contract, or any other suitable type of permission to contact the shipping companies.

In some exemplary embodiments, the transaction coordination system 10 may instruct one or more vendors to contact or query shipping companies on behalf of the system 10. In such a case, the vendors may receive one or more responses to such queries, which may then be forwarded to the system 10. In some embodiments, the shipping company may send the vendor query response directly to the system 10.

In exemplary embodiments, the transaction coordination system 10, based on information received from the shipping companies, may determine if any of recent sales matching demanded item(s) which have been shipped, e.g., are in transit, and may be rerouted to the requesting customer, 635. For example, the transaction coordinator 30, based on multiple factors, such as for example, location of requesting customer, location of shipped item, how far in delivery route the shipment is, etc., may determine whether any identified shipped items may be rerouted to the requesting customer within the time frame requested by the requesting customer.

In some exemplary embodiments, the transaction coordinator 30 may identify customers who have received their order that matches the item demanded by the requesting customer. For example, a customer may register with the system 10 and provide their shipment order information. Their order may be delivered, but such a customer may be willing to "reship" their order to the requesting customer in exchange for an appropriate benefit determined by the transaction coordinator 30. In effect, such a customer may act as a vendor with respect to the system 10. Such a customer may provide details to the system 10, e.g. whether or not their delivered item has been opened, still in original packaging, etc.

If any shipped including undelivered items are determined by the transaction coordination system 10 as capable of being redirected in time to meet the requesting customer's time requirements, the transaction coordinator 30 may further determine whether any sales could be rerouted, or whether the item via a new order may be placed for delivery to meet the original customer's delivery expectations. 640. If so, the transaction coordinator 30 may process a sale to the requesting customer either directly, or through the vendor the requesting customer placed the order with; and with the assistance of the shipping company reroute the shipment of one of the identified recent sales to the requesting customer, 650. The transaction coordinator 30 may direct a replenishment shipment of the same item to the original customer, whose package was rerouted to the requesting customer, using the same or different vendor and/or shipping company, for delivery within the expected timeframe, 660.

There may be times where no recent sales could be redirected without affecting the original customer's expected timeframe. In an exemplary embodiment, the transaction coordinator 30 may offer a reward to the selling vendor and/or to one or more of the original customers who's shipped order containing one or items that match a requesting customer order, in exchange for changing the delivery date. The reward could take any of a number of forms such as a cash discount or a future rebate, for example. If the offer is accepted, the transaction coordinator 30 may processes the sale to the requesting customer; redirect shipment of one or more of the identified recent sales to the requesting customer; and ship corresponding replenishment items to the customer of the identified recent sale for delivery within the newly negotiated timeframe, according to an exemplary embodiment.

In this way, the delivery timeframe of the requesting customer may be accommodated, and the affected recent customer may be compensated for agreeing to take late delivery of the recently purchased item. Such a solution maintains a satisfied customer base, while inexpensively and efficiently satisfying the needs of a urgent and/or impulsive customer.

If the offer is declined, the sale to the requesting customer may also be declined.

It should be noted that the example embodiment of the system components shown in FIG. 1 do not exclude other embodiments of the application, such as an internet or intranet enabled embodiment, for example.

Figure 7:
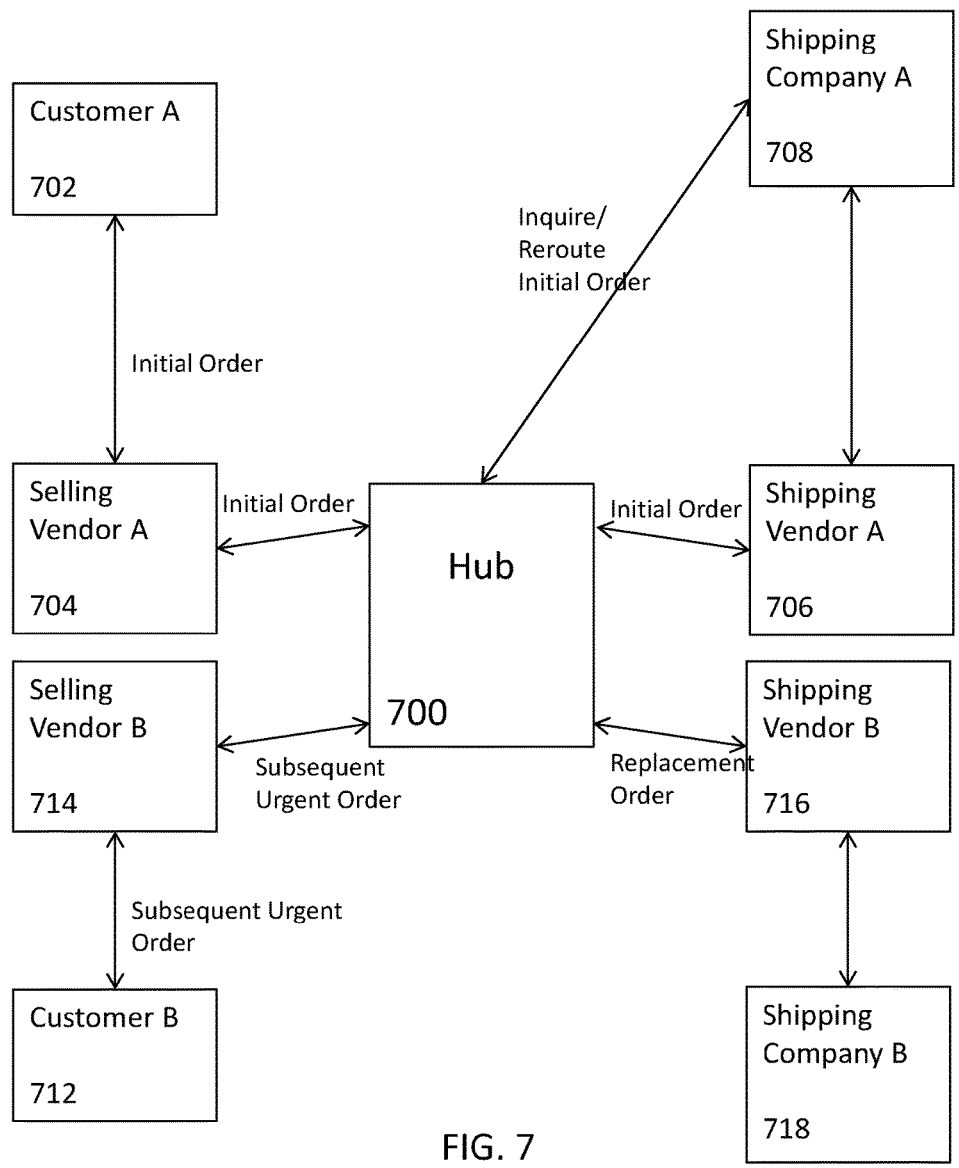
FIG. 7 is a schematic representation of a transaction coordination system interacting with one or more parties according to an exemplary embodiment of the present disclosure.

FIG. 7 illustrates an exemplary embodiment of the transaction coordination system of the present application. In such an exemplary embodiment, the master catalog 26 and/or the vendor catalog(s) 24 may not be centralized. For example, some or all of the information associated with the master catalog 26 and/or the vendor catalog(s) 24 may be implemented as single file or reside on a single computer system, such as in an electronic database. Such catalogs may be distributed and may be embodied as a set of files stored across one or more computer systems and/or networks. Such decentralized storage is common in web-enabled applications. In addition, there may be overlapping data which comprise portions of both the master catalog and the vendor catalog(s).

The system of FIG. 7 may be used to illustrate an example situation in which customer A, located in Bridgeport, Conn., may use a personal computer 702 to place an order for an item that costs $100. The order is taken by selling vendor A 704, located in Cupertino, Calif. If selling vendor 704 does not have the item in inventory or in stock, selling vendor 704 may employ hub 700 to identify shipping vendor A 706, located in Chicago, Ill., to fill the order using its current inventory. Shipping vendor 706 may utilize shipping company A 708 to ship the item from Chicago, Ill. to customer A 702 in Bridgeport, Conn. via standard 2-day ground delivery.

The following day, customer B, located in Columbus, Ohio, may use a personal computer (712) to place an order for the same item costing $100. Customer B may identify the order as urgent, requiring same day delivery. The order is taken by selling vendor B 712, located in Las Vegas, Nev. Same day shipping from Las Vegas, Nev. to Columbus, Ohio for a 2 pound package using UPS Express Critical Service would cost $450. The total cost of the order is $100+$450=$550.

Selling vendor B 714 may utilize Hub 700 to fill the order of customer B. Hub 700 locates all shipments for that particular product en route and identifies the item bound for customer A in the shipping company warehouse located in Dayton, Ohio that can accommodate the delivery timeframe of distressed customer B. This shipment belongs to shipping vendor A 706 located in Chicago, Ill. and is en route to customer A in Bridgeport, Conn. Because the shipment is located in Dayton, Ohio, close to customer B in Columbus, Ohio, the item can be rerouted with the shipping company's assistance and still arrive the same day as the distressed customer B expects.

Hub 700 may determine that the availability of the item and identifies shipping vendor B 716, located in Detroit, Mich., who can ship the product overnight to customer A in Bridgeport, Conn. Shipping vendor B 716 may charge $110 for the product and the shipping cost from MI to CT via overnight shipping is only $30.

Hub 700 may present selling vendor B 714 with the option to have the product delivered to the distressed customer B for only $145. Selling vendor B 714 may, in turn presents the offer to it's customer B at $160 who accepts the offer as the cost is significantly less than Express Critical shipping service charge.

Hub 700 collects $145 from selling vendor B 714. Selling vendor B 714 keeps the remaining $15 as an additional gain from the transaction. Selling vendor B 714 does not have to pack and ship the item. In fact, selling vendor B 714 may not have the item in its inventory.

Hub 700 places order with shipping vendor B 716 and pays shipping vendor B (716) $110 for the item. Shipping vendor B 716 realized a gain via regular profit included in the $110 price of the item. Moreover, shipping vendor B 716 obtained this sale without any marketing, advertising, or customer support expenses.

Hub 700 may place the shipment rerouting request with shipping company A (708) to redirect the shipment located in Dayton, Ohio en route to Bridgeport, Conn. to Columbus, Ohio for same day delivery to customer B. The Hub 700 may also place a delivery request with the shipping company B 718 and pays shipping company B 718 $30. Shipping company B 718 may pick the item up at the location of selling vendor B 716 and delivers it to customer A in Bridgeport, Conn. meeting the original promised delivery timeframe by selling vendor A 704.

As a result of this transaction, the Hub may realize a $5 gain ($160−$15−$110−$30=$5).

This particular transaction generated savings of $420, resulting from the difference between the Critical Express shipping cost from NV to OH ($450) and the overnight (air) shipping cost from OH to CT ($30). However, the amount of these savings may remain unknown to the two vendors because the parties to a transaction typically remain anonymous. From the perspective of the selling vendor B, the transaction cost $145, and from the perspective of the shipping vendor A, the cost is $110. These numbers, however, are generated by Hub 700, which could have retained a higher commission for the transaction, and paid each vendor a smaller percentage of the savings.

Shipping companies may weigh each package at their terminal. By retrieving the shipment weight as reported by the shipping company and comparing it to the product weight data as available in the master catalog, it may be able to predict with a high degree of accuracy if the shipping vendor has indeed shipped the product that he/she was supposed to. In this way, the system 10 may preemptively detect if there has been any shipment error. An exemplary embodiment describing a method implementing an error is described later.

Providing the ability for matching selling vendors with shipping vendors creates a market for transactions that can, in some ways, be analogized to commodity and stock markets. For example, once a shipping vendor confirms the order, he/she can turn around and treat the order as a new customer order and initiate a fulfillment query again on the hub. If there is sufficient market volatility and transaction volume on the hub, such chain orders are plausible and has the potential to create the so called "day traders."

The system 10 can provide the ability to allow vendors and customers place market, limit, stop market and stop limit orders. Thus, a customer may be able to place an order with certain price and delivery deadline parameters in order to test the market volatility and to land a "good deal". For example, a customer may be able to place an order for a Sony Cyber-shot DSC-W620 14.1 MP Digital Camera to be delivered to Los Angeles, Calif. 90049 by Dec. 23, 2012 at $100.00 from a vendor who has B+ ratings. This order may or may not be executed before the specified date.

The hub may also swap and/or redirect orders that contain different yet equivalent and/or acceptable interchangeable products. For example, some manufacturers may produce products for more than one distributor/vendor that are nearly identical in all respects, except for the name and/or model number associated with the product. The system 10 maybe able to identify products with different names and models numbers as equivalent for in order to carry one more embodiments described herein.

A market order indicates that the buyer wants the immediate execution of an order for a stated number of products at or near the current market price without any other restrictions. This means the order will seek execution once it is received by the market/hub, provided that the product is available in stock with at least one vendor. It should be noted that execution price, speed and liquidity are affected by many factors, including market volatility, size and type of order and available market centers. Given the speed at which prices can change under a fast market conditions may result in execution prices that are different from the quotes displayed at order entry.

A limit order indicates the highest price the buyer is willing to pay for a product, or the lowest price the seller is willing to accept to sell a product. Each limit order will be executed at the designated price or better. This helps protect the order from sudden volatility, but it also means a transaction will be executed only if the product reaches the price specified in the order. Unless one specifies how the limit order should be processed, such as "All or None," "Do Not Reduce," or "Fill or Kill," the order may be partially filled with fewer products bought or sold than requested if the specified price is met but the full quantity isn't available at that price. A limit order also allows a buyer to specify a time period within which the order remains active. The system will seek to completely fill each order at the limit price until the time period ends, after which the order will expire.

A stop market order indicates that the buyer wants a stop order to become a market order once a specific price has been reached. There is no guarantee that the execution price will be equal to or near the activation price.

Choosing stop limit for the order type indicates a buyer wants the order to seek an execution at a specific limit price or better once the activation price is reached. Stop limit orders include an activation price as well as a limit price. Depending on the strategy, the limit price and activation price may be the same. The order becomes a limit order once the activation price has been reached.

Although the previous examples describe systems and methods that optimize orders where the system 10 may arrange for pickup and delivery of one or more orders to end customers, it should be recognized that such optimization may also be performed by the system 10 on orders where the shipping company is already in the possession of the shipment. In other words, the transaction coordination system 10 may also optimize orders that have been shipped but not yet delivered. For example the system 10 may optimize "existing orders" that have been shipped by vendors directly using one or more shipping companies and are still en route. In fact, in some instances, a shipping company, in conjunction with the system 10 may reroute one or more orders.

For example, one or more shipping companies may engage in delivery optimization on its own authority, and/or with permission(s) from one or more customers and/or vendors so as to improve the aggregate transit time for all shipments.

Figure 8:
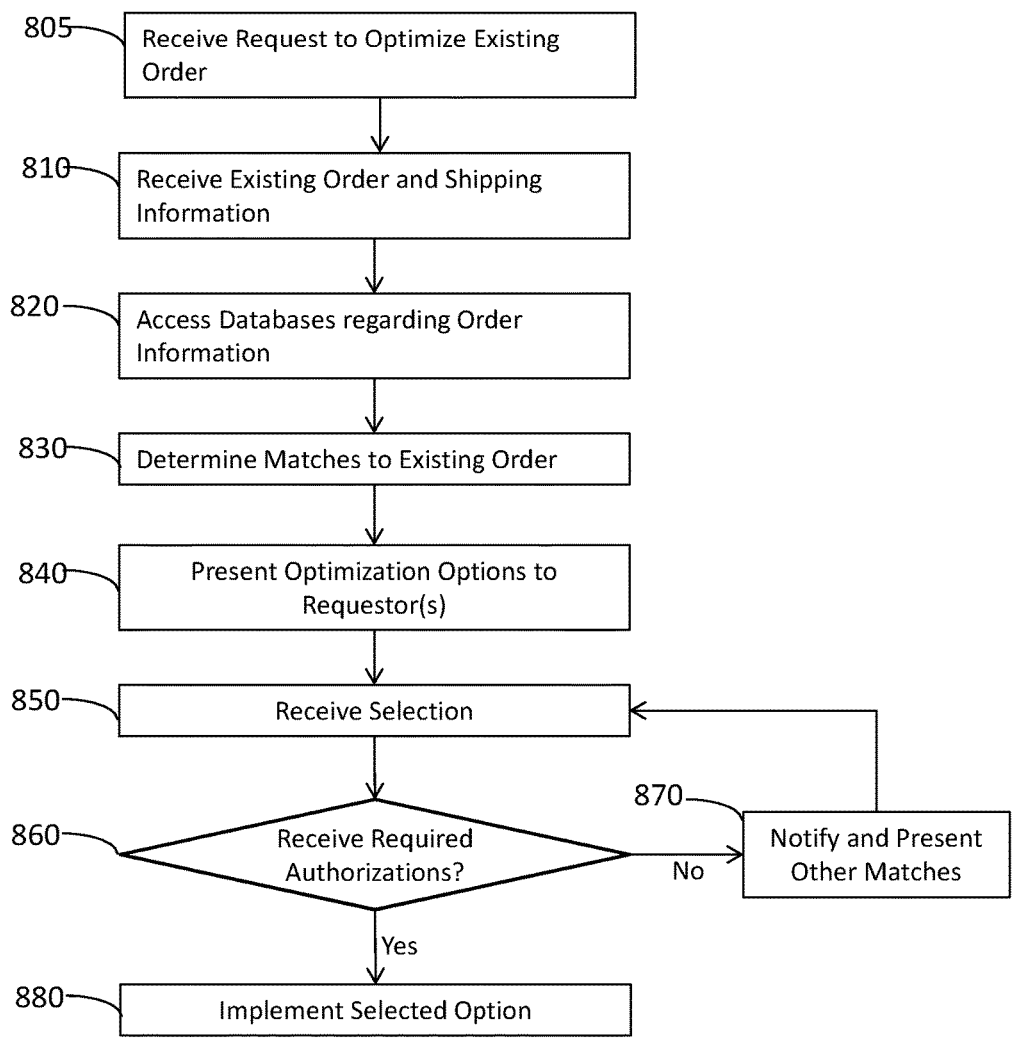
FIG. 8 is a flow chart illustrating a method for optimizing an order according to an exemplary embodiment of the present disclosure.

FIG. 8, shows according to an exemplary embodiment, a flow chart illustrating a method to optimize one or more already existing orders. The transaction coordination system 10 may receive a request to optimize an existing or already placed order, 805. A requestor may indicate a preference for optimizing delivery and/or price, and any other factor, so that the system may determine matches. The system 10 may also separately, or with the request, receive the corresponding order or shipping notification information from one or more requesting entities, 810. A requestor may be one or more of a customer/consumer, vendor, and or shipping company/carrier.

In exemplary embodiments, order, order interest, or shipping notification information may be sent by a requestor to the system 10 through any suitable means, such as, for example text messaging, email, fax, or the information may be manually entered through a web interface. In some embodiments, an application may reside and run on a one or more devices or systems associated with the requestor, such as, for example, laptop, desktop, electronic device, servers, smartphone, and the like. The application may automatically extract order information, such as from an email client software located on the device or a remote server. The application may also allow a requestor to manually enter and send the order and shipment information to the system 10.

In some exemplary embodiments, the transaction coordination system 10 may automatically retrieve or "pull" this order and shipment information from participating requestors' emails or from requestors' account with any type of party or organization described herein. For example, a requestor, such as a customer, may provide one or more email accounts with credentials such that the transaction coordination system 10 may automatically retrieve information related to orders. Web services exist, such as one provided by Slice, that identify and extract order/shipment information from the emails of the users' accounts. Slice, for example extracts and consolidates such information and presents the information conveniently to each of the users through a website interface, at GoSlice.com. Similarly, in an exemplary embodiment, a requestor may allow the system 10 to extract order and shipping information from email account(s) associated with the requestor automatically.

Any requestor with one or more linked email accounts, may further connect to the system 10 through a interface, such as, through a website. The information pulled from the linked email(s) may be already loaded when the requestor visits or logs in on to an interface associated with the system 10. The system 10, may already have processed the extracted information in order to present options to the requestor.

In exemplary embodiments, the order and/or shipping notification information may be forwarded during a payment/checkout process. For example, many online merchants rely on a third-party payment system or networks, such as, for example, Google Wallet, PayPal, Cybersource, Visa, American Express, TSYS, Echo, Chase Paymentech, First Data and the like and or third-party sales tax calculation system or service, such as, for example Avalara, Vertex and the like and or third-party shipping providers, such as, for example, UPS, USPS, FedEx, and the like. During completion of a checkout process, one or more of a vendor, third-party and/or customer may forward order and/or order interest information to the system 10. For example, a customer ordering a product online, may be presented an option to "optimize" the order. The payment service or sales tax calculation service may extract the information and forward to the system 10 for further processing. In other words, any value chain participant may forward order/order interest information to the system 10.

In exemplary embodiments, the system 10, after receiving the order and/or shipping notification information through any means, the deal finder 32 may preprocess the information in order to find a suitable optimization match, such as before the customer has indicated an intention to optimize their order. The system 10, may communicate, such as, for example, through email, text message, fax, phone, blog post and the like, to also notify the customer of one or more optimizing matches and/or present optimizing options to the customer.

In an exemplary embodiment the system 10 may access one or more databases associated with the system 10 in order to access product, vendor, customer, and/or shipping information, 820. The system 10 may use such information to determine matches to one or more products in the existing order, 830. For example, the information from the database(s) may be used to identify: i) inventory and/or recent sales from vendors matching one or more products in the existing order, ii) web sites that may sell one or more products in the existing order, and iii) other existing orders requested to be optimized from customers, vendors, shipping carriers, and the like matching one or more products in the existing order.

As explained herein, the system 10 may have access to information regarding one or more vendors affiliated with the system 10, which may include products that affiliated vendors sell. The information may also contain one or more affiliated vendors' inventory, and may match one or more products from the existing order. The system 10, may contact identified vendors to identify any recent sales and/or available inventory for sale matching the products in the existing order.

The system 10, may also crawl one or more online commerce websites or stores, such as, for example Beach-Camera.com, to extract information on available for sale products matching one or more items in the existing order. The accessed database(s) may contain information identifying one or more online commerce websites so as one or more web crawlers may extract information from the identified online commerce websites. The commerce websites do not necessarily have to be associated with vendors affiliated with the system 10.

The system 10, may also receive requests to optimize other existing orders. These requests, may be received from customers, vendors, value chain participants, and/or shipping companies. The system 10 may keep records or the information regarding these requests in one or more electronically accessible databases, such as, for example a Request Database 23g. The system 10 may access this information to determine if any of the other requests to optimize an order may be a match.

In an exemplary embodiment, the deal finder 32 may process the information received from the one or more databases, vendors, websites and other existing requests to optimize in order to determine one or more suitable matches to the customer order, based on one or more parameters, 830. For example, identified matches may include, for example, a recently sold and shipped item, and/or an item that can be ordered from a non-affiliated vendor's website.

From the matches, the deal finder may be able to present one or more optimization options to the requestor. The requestor, as explained, earlier may be any party, such as, for example, shipping company, vendor, participating intermediate third-party and/or customer. For example, a requestor may be a customer who wants to optimize an already placed order for delivery time. An optimized match may result from any suitable trade, such as swapping and/or arbitraging orders, vendors, customers, shipping carriers, changing delivery addresses, value chain participants, and combinations thereof.

For example, one exemplary optimization match may include rerouting a first existing, yet undelivered order that contains an item that was recently sold by a first vendor and can be delivered to a requesting customer faster than the requesting customer's order from a second vendor. In such a case, the requesting customer's order may be delivered as replacement for the rerouted order. The same principle may be extended to other requesting parties. In another example, a shipping company may request to optimize delivery of order with a specific item, and an optimized match may be to reroute another shipped order from a different carrier having the same item. As explained in other exemplary embodiments, a match may be determined by the ability to redirect an existing order and also replenish the rerouted order with a suitable replacement order. A match could also be identified to be another vendor who can directly ship the same item faster, cheaper, and/or more efficiently to a delivery address than another vendor and/or shipping company.

The candidate matches for rerouting may be determined based on the delivery timeframes, potential cost/savings from rerouting, ability and willingness of parties to reroute, social relationships/connections between the parties, reputation of vendors associated with orders, shipping companies involved, addresses associated with the customers, and the like.

For example, in a simple situation with a first requesting customer, Customer A on the West Coast, such as Los Angeles, has ordered a product that is being shipped from the East Coast, and a second requesting customer, Customer B in New York has ordered the same product that is to be shipped from the West Coast, the system 10 may determine that such a match as a candidate to be rerouted based on potential savings in shipping costs. It is to be noted that the system 10 may determine a match involving more than two requesting customers having their Orders rerouted.

For example, the system 10 may be able to determine shipping savings as a result of rerouting and/or swapping the destination of the orders of such a match by accessing data regarding different shipping carrier's shipping rates. In some exemplary embodiments, the system 10, may have preferred relationship with the shipping carriers which may allow the system 10 to realize an advantage in order shipment rerouting. With respect to one or more shipping carriers, the system 10 may query one or more shipping carriers to get an estimate regarding costs/savings to reroute one or more order shipments, and then use that information in determining suitable matches.

In exemplary embodiments, a destination address to deliver or reroute an order may not be the original destination address associated with the prerouted order. For example, using the simple example of two requesting customer as described above, Customer A and Customer B, Customer A's order may not be rerouted to the destination address associated with Customer's B prerouted order. The system 10, for example, may propose rerouting to another destination address suitable and/or acceptable to one or more requesting customers. For example, Customer's A order may be rerouted to a Post Office. Loading Station, Shipping Carrier Hub, alternative address or may even pick up the order herself from the current location without further rerouting and the like. For example, a requesting customer may allow an order intended to be delivered to a home address be allowed to be rerouted to a place of employment in order to realize savings. In yet another example, an order may be delivered rerouted to a place, e.g., a repository, warehouse, store, shipping center, building, etc., to allow in-person pickup of the order. In this regard, the customer, or a person designated by the customer may pickup the order.

In an exemplary embodiment, the system 10, through an interface or any suitable means, may provide the optimization transaction options to the requestor, 840. The system 10, then may receive a preferred match selection from the requestor, 850, through any suitable means described herein, e.g. text, fax, telephone, email, blog post, communicated via an electronic interface, etc.

For example, the system 10 may present a first match where a requesting customer may get a certain delivery time frame for a said price, and the requesting customer may also be presented with another match for a second faster delivery time for a higher price or premium. For one or more of the options presented to the customer, further information may also be presented regarding the one or more parties involved in the optimization transaction option. For example, some personal or demographic information regarding the customers may be shared, and in some embodiments, the identity of the customer may also be provided, and/or any relationships between the customers.

The requesting party may select a match which is received by the system 10. The system 10 may automatically select a pre-determined optimization option by the system 10. The automatic selection may be at least based on one or more preferences a requestor has previously indicated to the system 10, such as the type of order, the savings involved, the vendors, the identity of any customers to be involved, and/or any relationships between the parties, shipping carriers, and the like. Otherwise the requesting customer may decide against the optimization choices and cancel the request to optimize.

The system 10, may determine whether it has the acceptance as well as the authorization to act on behalf of one or more parties in order to implement a selection, 860. The presented options may require one or more other parties to also accept the option, such as, for example, ordering a product, rerouting a shipped order, changing recipient name and delivery address, and the like. The option may also require authorization in order to implement such an action. In other words, at least one party, a vendor, customer, value chain participant, and/or shipping company may need to accept an optimized option and provide authorization to allow the system 10 to act on behalf of that party with respect to an order.

For example, a requesting customer may authorize or allow the system 10 to provide control over the order, such as, for example, using a power of attorney, or any other suitable type of permission. The power or permission to control the order, may allow the system 10 to take various actions with respect to the customer's order, such as, for example, to act on behalf of the customer to cancel the order with the vendor, change the delivery/recipient name and address, change the payment method, change the delivery arrival timeframe, reroute the order, change shipping carriers for an order, change any of the order related value chain participants like payment processors, and any combination thereof. This power or permission to act on behalf of a requestor with respect to one or more orders may implemented through a contract, such as, for example a contract presented through an a website and presented to customer for approval. This contract or power provided may be of varying authority, such as for example, each time the customer requests to optimize an order. In other circumstances, the requestor may give the system 10 a blanket authorization, so as to allow the system 10 to act on behalf of the requestor for all orders that are requested to be optimized. In some embodiments, the authorization power or contract may be restricted to specified duration, the order and items involved including amounts, billing and shipping address, method of payment, the vendors, other customers, shipping carriers, value-chain participants, etc. and any combination thereof. In an exemplary embodiment, the system 10 may also receive the authorization, before a specific optimizing request, to automatically optimize and reroute one or orders by a party without the need for additional future input or a request by the party.

If the system 10 does not receive the authorization, in enough time, the system 10 may not implement the proposed selected option. The system 10 may notify the requestor that it cannot implement the selection and present other optimizing options, 870.

If the system 10 receives a selection and receives the required authorization from one or more related parties, the system 10 may submit instructions to implement the transaction according to the terms of the presented option. After a selection match has been determined and authorized by the required parties, the transaction coordinator 30 may submit a request to the vendors, shipping carriers, etc. to direct one or more orders to a proper destination, 880. This may be done through any suitable means. The system 10 may receive updated shipping information from the one or more of vendors and shipping carriers involved in the transaction. The system 10 may notify and provide this updated shipping information to one or of the vendors, shipping carriers, and/or customers involved in the transaction. For example, customers may be provided with an updated shipment tracking number and/or may be provided with information regarding new estimated delivery dates.

Exemplary Coordination:

This example, illustrates the transaction coordination system 10 implementing a rerouting of two or more orders.

Customer A, located in California may place an order for a first product with Vendor 1. The Vendor 1 may send the order and/or shipping notification information to Customer A. The information may indicate that the Customer A may not receive the delivery of the product until a week later. For example, Vendor 1 may be shipping the product from a warehouse located on the East Coast. Customer A, may then submit a request to optimize delivery of the order to the system 10. For example, Customer A may submit this information via an interface to the system 10 according to embodiments described herein.

Similarly, the system 10 may also receive requests from Customer B, Vendor 2, and Shipping Company X respectively to optimize their existing orders. Vendor 3, may have received and shipped an order to Customer E, but has not submitted a request to the system 10. However, the system 10 may identify Vendor 3 as selling the same product as in Customer A's order and therefore may contact Vendor 3 for information regarding any recent sales regarding the same product. Vendor 3 who also may be located in California may have recently sold the same product to Customer E. The information provided by Vendor 3 may determine that shipment to Customer E could be optimally rerouted to Customer A.

The orders from each party may at least in part contain the same product as Customer A's. The system 10 may identify such requests as potential matches if those orders contain the same product as Customer's A order. Customer B may also request to expedite or optimize the delivery of the order, while Vendor 2 and Shipping Company X may request to optimize shipping costs. The system 10, may receive such requests before or after the request received from Customer A, but within a suitable time frame. Customer B, may be located in New York and is ordering the same product as Customer A. Customer's B order is being shipped from Denver. Vendor 2 may have sold a product to a Customer C, that is located in Florida. Vendor 2's warehouses may be located in California. Shipping Company X may be located in Arizona and is shipping their order to Customer D in Philadelphia.

The system 10 may determine one or more options to Customer A in order to expedite delivery. For example, the system 10 may propose the following options
Option 1: "Swapping" orders with Customer B, such that Customer's B order shipping from Denver is rerouted to Customer A, while Customer A's order is rerouted to Customer B. The system 10 may also propose
Option 2: Rerouting Customer A's order to Customer C, and rerouting Vendor 2's shipment from Customer C to Customer A.
Option 3: Rerouting Customer A's order to Customer D and rerouting Shipping Company X's shipment to Customer A.
Option 4: Rerouting Customer A's order to Customer E and rerouting Customer E's order to Customer A.
Option 5: Rerouting Customer A's order to Customer B, rerouting Customer B's order to Customer C, and rerouting Customer C's order to Customer A The options may each be proposed with separate delivery estimates and cost estimates. The system 10 may also propose each option along with rating information, for example ratings regarding the Vendors, Customers, Shipping Companies, etc. associated with each option. Moreover, any relationships or connections between Customer A, and a Customer in one or more of the options may also be presented.

If Customer A decides to select Option 1, because Customer B is a friend of Customer A. The system 10 may then propose the transaction with Customer B. If Customer B accepts, the system 10 may if it has not already, request authorization to reroute Customer A and Customer B's orders. The system 10, after receiving any needed authorization, then may transmit the request to reroute the existing orders to the shipping companies associated with Customer A's and Customer B's existing orders. After receiving delivery confirmation, the system 10 may then debit/charge Customer A and/or Customer B a fee, for providing the service. The system 10 may charge a credit card, debit card, gift, card, PayPal account, mobile Wallet, etc. A commission may be based on the savings that each Customer realizes as a result. In some embodiments, there may not be savings, such as the case where one or more parties require immediate delivery but the system 10 merely charges a flat fee.

If Customer A decides to select Option 2, because Vendor 2 is rated as a highly qualified or reputable vendor. The system 10 may then propose the transaction with to Vendor 2. Vendor 2 transmits an indication of acceptance. The system 10 may, request authorization to reroute Customer A and Vendor 2's orders. Vendor 2 may also allow an proposed swap to be approved and authorized automatically if certain conditions are met, such as price, delivery timing, etc. The system 10, after receiving any needed authorization, then may transmit the request reroute the existing orders to the shipping companies associated with Customer A's and Vendor 2's existing orders. In some situations, Vendor 2, may on its own, without the system 10 reroute the delivery from Customer C to Customer A, and then send the updated information to the system 10 to forward to Customer A. After receiving delivery confirmation, the system 10 may then debit/charge Customer A and/or Vendor 2 accordingly.

If Customer A decides to select Option 3, because the option associated with Shipping Company X offers the best combination of savings and delivery speed. The system 10 may then propose the transaction with Shipping Company X. If Shipping Company X accepts, the system 10 may if it has not already, request authorization to reroute Customer A and Shipping Company X/Customer D's orders. The system 10, after receiving any needed authorization, then may transmit the request to reroute the existing orders to the shipping company associated with Customer A. Shipping Company X, on its own may reroute the order intended for Customer D to Customer A. After receiving delivery confirmation, the system 10 may then debit/charge Customer A and/or Shipping Company X, for providing the service.

If Customer A decides to select Option 4, because the option is associated with the quickest possible delivery. For example, Vendor 3's order to Customer E may been placed some time ago and the shipment is currently located close to Customer A. If Customer A selects this option a surcharge may also be required in order to compensate Customer E for "losing" her intended delivery date. If Vendor 3, accepts the propose transaction swap, the system 10, after receiving any needed authorization, then may transmit the request to reroute the existing orders to the shipping companies associated with Customer A's and Vendor 3's existing orders. In some situations, Vendor 3, may on its own, without the system 10 reroute the delivery from Customer E to Customer A, and then send the updated information to the system 10 to forward to Customer A. After receiving delivery confirmation, the system 10 may then debit/charge Customer A and/or Vendor 3 accordingly.

If Customer A decides to select Option 5, because the option is associated a quick delivery for a lesser price. In this example, an option may involve multiple parties, a Customer, Vendor, and another Customer. The system 10 may determine a three, four, or more way trade that may satisfy one or more parties. For example, Vendor 2's order to Customer C, may still be in California and can be quickly shipped to Customer A. Further more, Customer A's order from Vendor 1, may also be easily shipped to Customer B as both parties are located on the east coast. Similarly Customer B's order may be tracked and determined to be in transit so as to be easily rerouted to Customer C. If Customer B, and Vendor 2, accepts the propose transaction swap, the system 10, after receiving any needed authorization, then may transmit the request to reroute the existing orders to the shipping companies associated with Customer A's, Customer B's and Vendor 2's existing orders. In some situations, Vendor 2, may on its own, without the system 10 reroute the delivery from Customer C to Customer A, and then send the updated information to the system 10 to forward to Customer A. After receiving delivery confirmation, the system 10 may then debit/charge Customer A, Customer B, and/or Vendor 2 accordingly.

In some embodiments, social network information may be displayed. For example, the system 10 may determine a relationship or connection between one or more parties in a proposed option, such as the relationship of Customer A and Customer B, e.g. whether they friends, members of the same group, etc.

FIG. 8A is an exemplary representation of an interface displaying determined by the system 10, which may display one or more options and information associated with the option. The interface may allow a user, such as Customer A to easily make an informed selection. FIG. 8B, shows an exemplary representation of an interface after Customer A has made a selection of Option 1. FIG. 8C, shows an exemplary representation of an interface after Customer A has made a selection of Option 5.

While the above example was presented from Customer A's point of view, it can be appreciated, other permutations of swap options may be presented with respect to the other parties. For example, Customer B, Vendor 2, Shipping Company X, Vendor 3, and other parties may each be provided one or more options to reroute with respect to one another. For example, Customer B may be presented with one or more options different than those presented to Customer A. Customer's B options may also contain the proposed transaction with Customer A. As can be appreciated any proposed option requires acceptance from all the required transaction participating parties in order to proceed. For example, with respect to Option 1, if Customer A selects this option, Customer B may be alerted and presented, such as on an interface, an option to agree to the option and/or decline. In exemplary embodiments, other parties who have affected by an accepted transaction option, their permission may not needed, as those parties may be bound to accept other parties decisions.

In an exemplary embodiment, the system 10 may work in conjunction with one or more social networks, such as, for example, Facebook, Google+, LinkedIn, and the like. A customer may share their social network information, such as, connections, preferences, permission to connect and share data, etc, with the system 10. The system 10, such as the optimal deal finder 32 may access and utilize the social network information in determining one or more suitable matches for a consumer/customer in various exemplary embodiments described.

In an exemplary embodiments the system 10, may match one or more customer, vendors, shipping carriers, and the like based on any connection or relationship between the parties in a optimization transaction.

Figure 9:
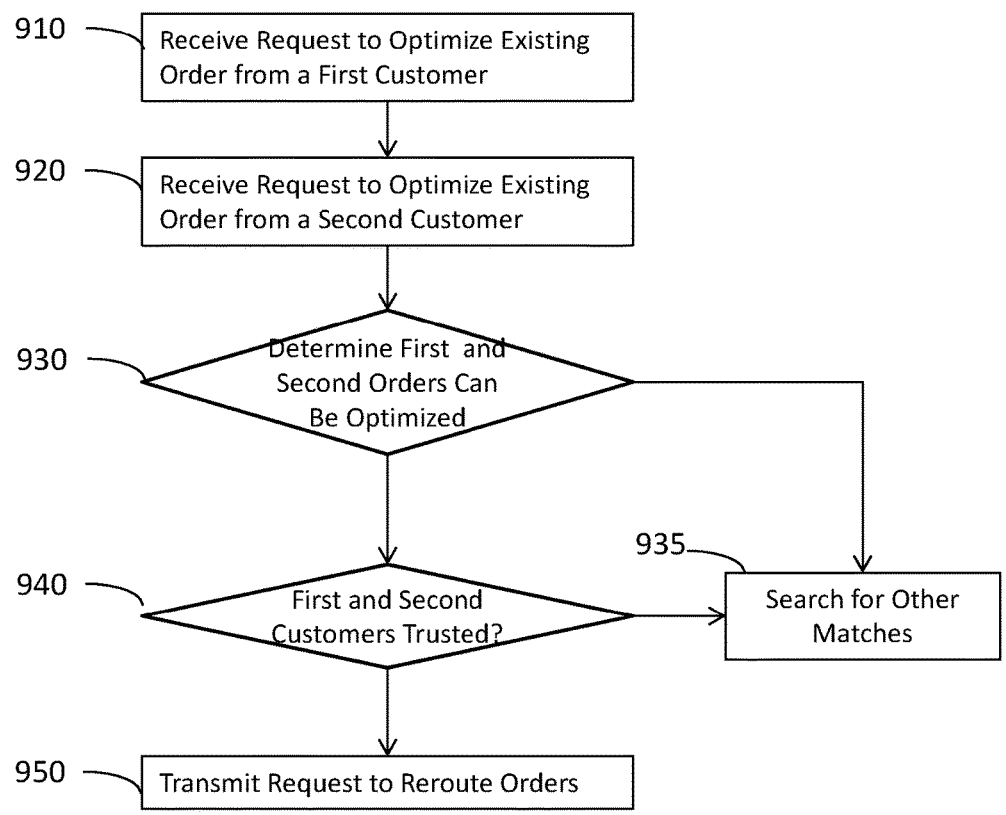
FIG. 9 is a flow chart illustrating a method for optimizing an order according to an exemplary embodiment of the present disclosure.

FIG. 9, shows according to an exemplary embodiment, the transaction coordination system 10 involving an optimized "swap" of already existing orders. The system 10, may receive through any suitable means, a request to optimize for delivery a first existing order from a first customer, 910. The system 10 the may receive a request to optimize for delivery a second existing order from a second customer, 920. The system 10 may receive shipping notification and/or order information associated with the first and second order. For example, in this scenario, both the orders from the first and second requesting customer share one or more common attribute. Therefore, the system 10 may determine if the first and second order may be optimized, 930, based on delivery time frame, shipping costs and any other relevant parameters.

If the first and second order cannot be optimized, such as, there would be no or insufficient delivery and/or cost savings from arbitraging or rerouting the orders with respect to each other, the system 10 may search for other matches for each of the orders respectively, 935. If, however, the first and second orders can be optimized, such as, for example rerouting each of the orders to the other customer, the system 10, may determine if the parties may trust each other for the swap, 940.

As previously discussed, one or more of the customers may automatically allow orders to be rerouted based on trust or confidence with another customer. For example, a requesting customer may set as preference to only allow an order to be swapped with another party, such as customer who is connected to in a social network sense. For example, if they two requesting customers share their social network profile information, the system 10 may determine the two customer are connected and can be "trusted" to implement a swap. In other embodiments, one or more customer may allow a swap with one or more parties that are indirectly connected, such a connection of a connection. For example, a requesting customer may allow swapping with a party that is within a certain "degree of separation" socially, i.e. a connection of a connection, or in a Facebook scenario, a friend of a friend. If the two or customers who have submitted requests to optimize identical orders, the system 10 may determine if there the two customers are within a specified degree of separation. If the two customers, with matching orders, are within each other's degree of connection, the optimization option may be implemented, with or without need for additional input or acceptance from one or more of the parties involved, 950.

As can be appreciated, the system 10 may also determine one or more matches that involve one or more parties that may be socially connected in other ways, such as belonging to same or similar groups, linked indirectly through any mutual connections, linked through connections of connections, or having similar interests. The system 10 may present the linking information to the one or more potential parties in a match. For example, the system 10 may determine a match between two requesting customers who are alumni from the same university, work for same employer, belong to same hobby/trade groups/charity, play on same sports team, and the like. The system 10 may notify one or more of the requesting customers of this link in order to induce an acceptance of a proposed rerouting of an existing order.

Similarly, the system 10, through one or more social networks, may implement a referral or recruiting service. By providing access to a user's social network, the system 10 may be able to invite others connected or associated with the user's social network account to join or utilize the transaction coordination system 10. In exemplary embodiments, a user may also personally refer others, either through a social network or through any other means, such as for example, email, text, blog post and the like. A user may be rewarded if any other referred users subsequently join and/or use the transaction coordination system 10. For example, a referring user may be given a credit, coupons, or any other reward, including reward in non-monetary forms such as achievement badges, frequent flier miles, reward points, service or product upgrades and the like.

In exemplary embodiments, the system 10 may conduct certain checks to avoid order errors. For example, the vendor catalog and/or master catalog may include information regarding various products offered by affiliated and non-affiliated vendors. The information may include physical information regarding the products offered by the vendors, such as for example, size, weight, shape, color and the like. The system 10 may also store or have access to information regarding the packaging of one or more shipping carrier including photograph. For example, based on the product quantity, packaging weight, packaging dimensions, product weight information, and the like, the system 10 may determine whether the correct product was indeed shipped from a vendor.

Figure 10:
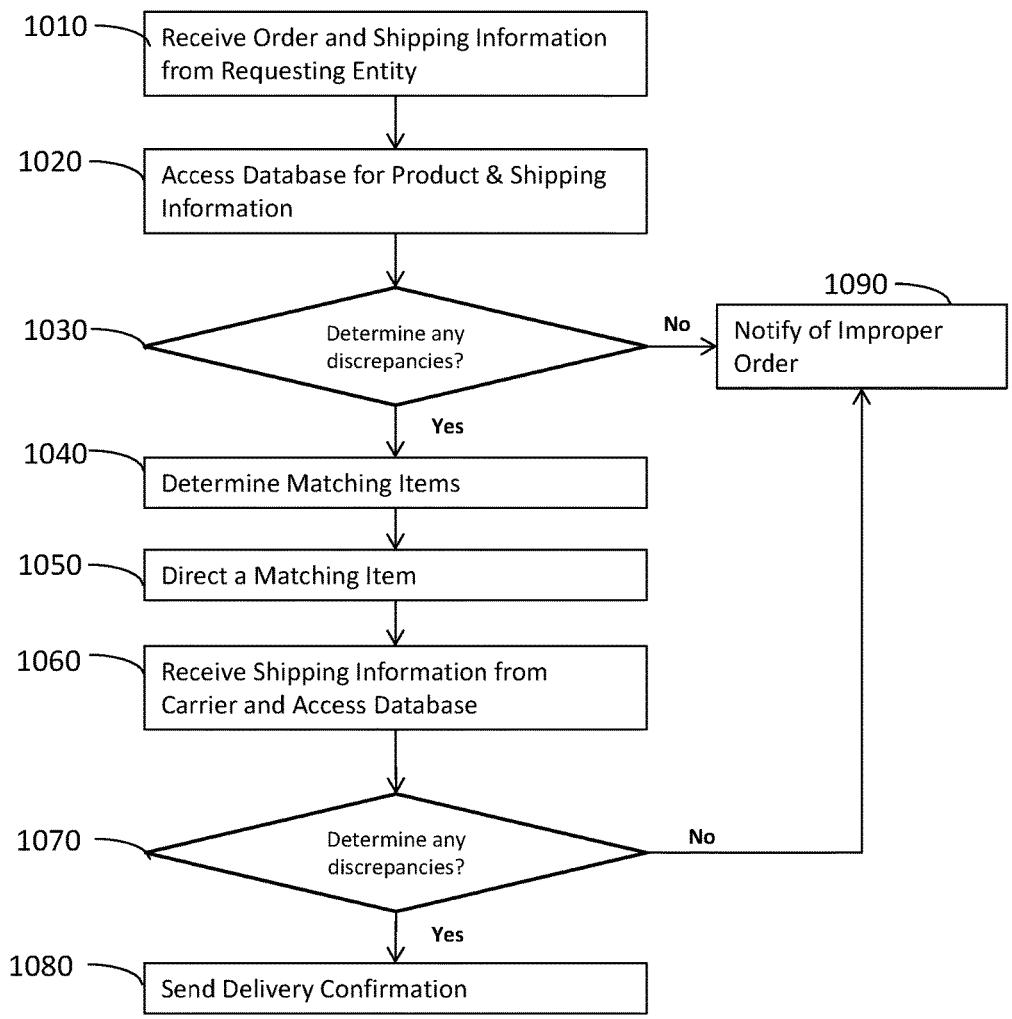
FIG. 10 is a flow chart illustrating a method for error checking a shipped order according to an exemplary embodiment of the present disclosure.

FIG. 10, shows a flowchart describing a method to implement shipment error checking and alert according to an exemplary embodiment. In an exemplary embodiment, the system 10, may receive a request to optimize an existing order, 1010. With the received request, the system may receive order and shipping information. Using the received information regarding the order and shipment, the system 10 may access information in one or more databases regarding the shipment and the product, 1020. The system 10 may access the weight information of the packaging and the weight information regarding the product. For example, from the accessed information, the system 10 may determine with a certain degree of confidence, whether the correct product was shipped, 1030. For example, the system 10 may determine that shipped product package should weigh 5.0 pounds, with a 10% margin of error. If a product within a half a pound (10%) of 5.0 pounds, then the system 10 will not determine any incorrect shipment. However if the shipment weighs 6.0 pounds, outside the range, the system 10 may determine that shipment does not have the correct product. The system 10 may also check if the correct quantity is indicated in the order. The system 10 may also flag an error alert if the packaging size is wrong. For example, if a 42-inch television is to be shipped or rerouted, and the packaging dimensions are less, such as at most 36 inches long, the system may determine there has been an error.

If the shipment is flagged to have the incorrect product, the system 10 may notify one or more transaction participating parties in order to intervene as soon as possible, 1090. If no error has been flagged, then the optimization process may continue according to embodiments described herein. The system 10 may determine if any matches exist to optimize the order, 1040. After finding a suitable match, the system 10, may, as described in embodiments, herein direct the matching item to the appropriate destination, 1050. For example, this may include placing an order with a vendor or redirecting an already existing order in transit. The system 10, may receive shipping order information about the ordered or redirected matched item, and use the information to access the one or more databases containing product and shipment information, 1060. The system 10, using the accessed information, may determine to a certain degree of confidence, whether the correct product has been shipped, 1070. If the shipment has the incorrect product, the system 10 may notify one or more transaction participating parties in order to intervene as soon as possible, 1090. If no error has been flagged, then the system 10 may send a confirmation notice to party originating the optimization request, 1080.

In exemplary embodiments, the system 10 may implement an internal tracking system for transactions facilitated through the hub. In an exemplary embodiment, the system 10 may generate one or more tracking numbers that may be transmitted to consumers, vendors, value chain participants, and/or shipping carriers. For example, in embodiments described herein, when the system 10 finds an optimized match, such as an existing order from a vendor, the system may need to send updated shipping and label information to the vendor and/or the new intended consumer. In some situations, more than one shipping carrier may be used to deliver an order to a consumer. Therefore, a consumer may repeatedly receive a tracking number each time a new carrier is used in order to track a package that has been rerouted.

In exemplary embodiments, the system 10 may transmit to a consumer, vendor, shipping carrier and the like a tracking number that may be associated with proper and/or updated delivery information. The tracking numbers may be stored in one or more electronic databases, such as, for example a tracking number database accessible by the system 10. The database may be updated and configured to store electronically accessible shipment and delivery information associating with one or more tracking numbers stored in the database.

Figure 11:
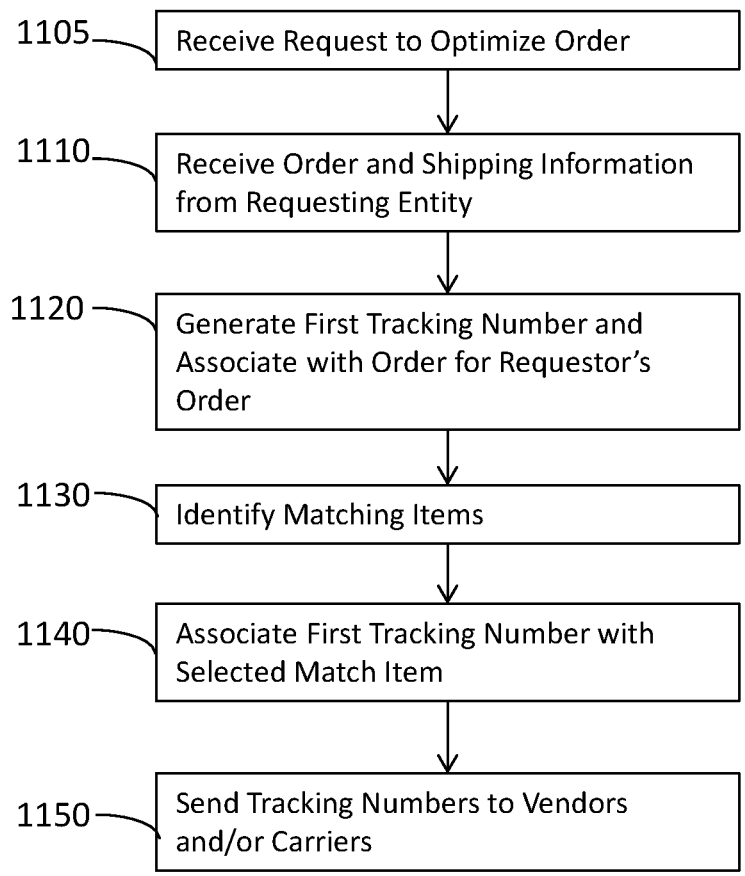
FIG. 11 is a flow chart illustrating a method for providing tracking information according to an exemplary embodiment of the present disclosure.

Referring to FIG. 11, in an exemplary embodiment, the system 10, may receive a request to optimize an existing order, 1105. For example and as described in various embodiments herein, the system may receive a request to optimize a transaction, e.g. an existing order, from a consumer, vendor, shipping company, and the like. In conjunction with the received request, the system may receive order and shipping information, such as from the requestor or from an entity associated with the requestor, 1110. Such information may include name, address, email addresses, carrier information, delivery time estimate, product information and the like. This information may be stored in one more databases associated with the system 10.

According embodiments, described herein, the system 10 may determine and identify one or more matches to the existing order, 1120, and implement an optimization request. For example, the system 10 may reroute one or more existing yet undelivered orders. In an exemplary embodiment, the system 10 may generate a tracking number associated with each of the orders to be rerouted, 1130. The tracking number may be forwarded, through any suitable means described herein, to one or more of the parties to the transaction, 1140.

The system 10 may store the generated tracking numbers in one or more databases. In an exemplary embodiment, the system 10 may receive and store shipment information regarding an order, and may associate the stored shipment information with the generated tracking number for that order, 1150.

For example, the system 10, may at various times, receive shipment information from one or more of shipping carriers, vendors, consumers, and the like for an order that has or may be rerouted according to embodiments described herein. This information may include, for example, shipment tracking numbers, delivery time estimates, current shipment locations, path traveled, and the like, for orders. The system 10 may store such shipment information in the database according to the generated tracking number associated with rerouted order.

For example, if a rerouted order changes or switches from a first shipping carrier to a second in the delivery process, the shipping information with respect to that rerouted, e.g. from the first shipping carrier and second shipping carrier may be stored and associated with the generated tracking number for that rerouted order.

An entity, e.g. a customer, vendor, and/or shipping carrier, that receives the generated tracking number may use the number to track the progress of their delivery. For example, the system 10 may provide an interface for entering generated tracking numbers. The system 10, may receive a generated tracking number to provide the current shipment information to the requestor. The system 10, may automatically receive and store updated shipment information from the carrier, and may simply forward and/or electronically provide this information to the tracking requestor.

In other embodiments, the system 10 may need to check the current status and location of a rerouted shipment. For example, the system 10 may receive a generated tracking number and access a tracking database, to determine the actual and current tracking number and the current shipment carrier. The system 10 may use the current tracking number to contact the associated shipping carrier to retrieve the current shipment information, and then provide this information to the requestor through any suitable means described herein.

In some exemplary embodiments, after receiving the generated tracking number to determine the current actual tracking number and current carrier for the rerouted order, the system 10 may provide a link directly to a tracking webpage associated with the current carrier. For example, the system 10 may provide to a link a tracking web page associated with the current carrier, after the tracking number has already been entered. The requestor may use this link to directly see the progress of a shipment from the carrier's tracking web page.

In exemplary embodiments, the system 10, may reroute orders. In exemplary embodiments, the system 10 as a result of rerouting orders, may realize sayings to one or more parties, and may also receive a commission based on the savings. For example, if the system 10 reroutes an order, shipping cost savings may be realized to one or more customers. In other words, the savings realized from using the system 10 may be initially provided only to a party other than the transaction coordination system 10. Thus, in order to recoup a portion of the savings, the system 10, may require that one or more parties involve in optimization transaction, e.g. the customers, vendors, shipping companies, value chain participants; and the like, forward at a share of the savings to the system 10. This may be accomplished by requiring one or more parties to financially register and/or provides financial information to the system 10, so that the system 10 can later charge an appropriate amount to that party.

In some exemplary embodiments, the transaction coordinator 30 may optimize and/or propose various transaction options instead of or in addition to proposed delivery/rerouting options. In some exemplary embodiments, the transaction coordinator 30 may present alternative transaction options, involving use of, for example, payment types, payment processors warranty and/or insurance providers, to name a few, to one or more parties of a given transaction.

For example, a first payment processor may desire greater exposure of their services and may indicate to the system 10 a willingness to provide a discount and/or benefit when their service is used by vendors, customers, etc. As such, the transaction coordinator 30 may promote to appropriate parties, one or more transaction options using this payment processor. For example, proposed transaction options may be presented during any suitable point in a shopping process, such as during the checkout process. In the example of the payment processor, a vendor may be provided additional benefits for use of that payment processor by customers who purchase items from the vendor. Further, some transaction options may also provide a benefit not only to a vendor, but also to customers, and/or any other suitable party depending on the proposed option.

In another example, a customer who was originally going to pay for an order at a vendor's website using a Visa credit card, may be presented with an option to pay with American Express card (AMEX) instead. The system 10, may charge a fee or separately collect a bonus from AMEX which it may share with the customer, vendor, or any other appropriate party. The transaction coordinator 30 may coordinate with various value chain participants, and vendors in order to present transaction options to the customer.

In some exemplary embodiments, the system 10 may present combination options, involving a plurality of parties. In one example, a proposed transaction option may involve providing a benefit to a customer who chooses FedEx for delivery and pays for an order using AMEX.

In exemplary embodiments, rerouting or swapping may involve the system 10 instructing, through any suitable means, a party (e.g., a shipping carrier, vendor, customer, etc.) to reroute one or more orders. The system 10 may obtain and provide any necessary information (e.g., name, address, etc.) in order for a party to redirect a delivery. In some exemplary embodiments this may be accomplished updating and/or editing existing order information via the system associated with a party. In some exemplary embodiments, redirecting an order may include a party, such as a vendor, cancelling an order for a first customer, and then placing a new order identical or similar to the cancelled order for a different customer at a second address.

Figure 12:
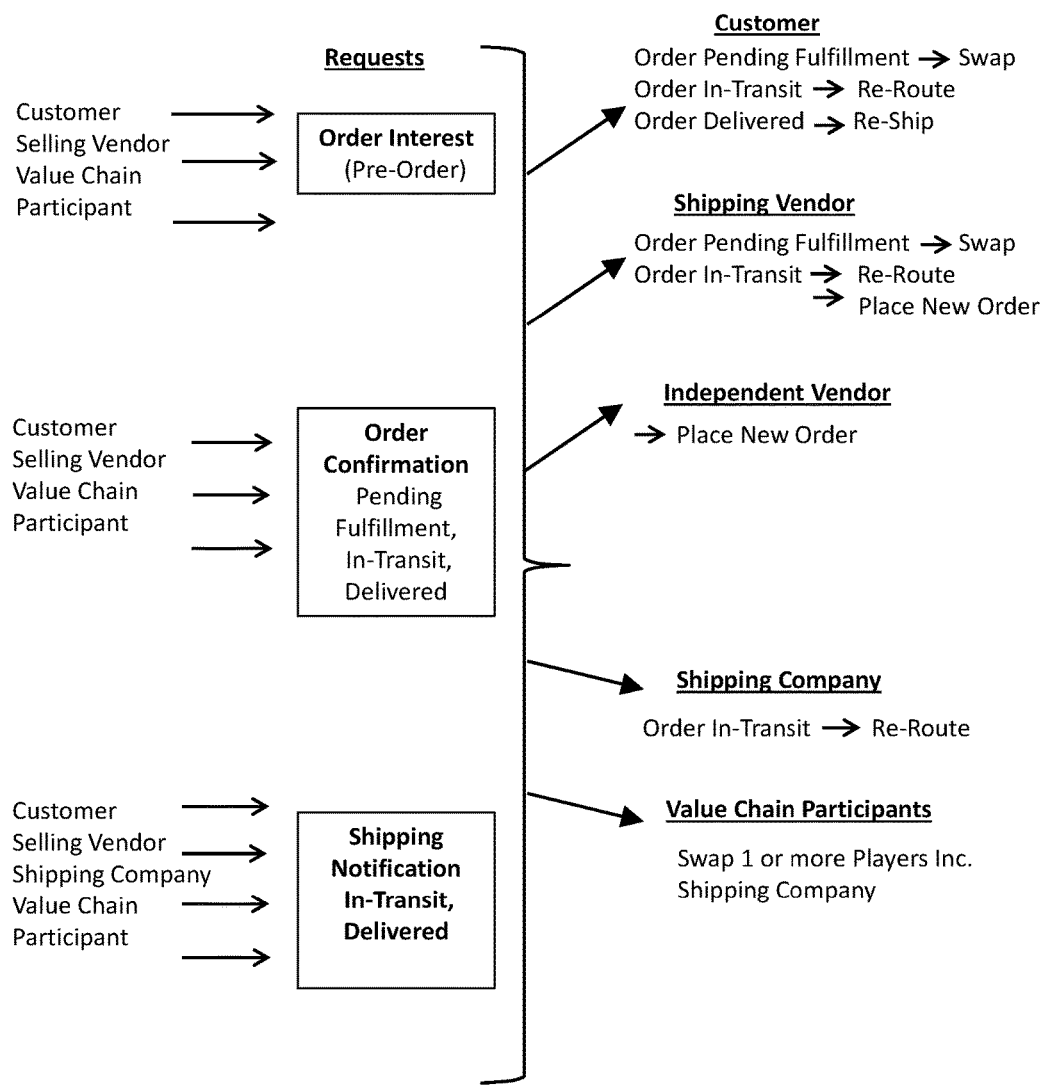
FIG. 12 is a representation of a transaction coordination system interacting with one or more parties according to an exemplary embodiment of the present disclosure.

FIG. 12 is a diagram schematic representation of a transaction coordination system 10 interacting with one or more parties according to an exemplary embodiment of the present disclosure. For example, the left half of FIG. 12 shows various permutation of requests that may be received by the transaction coordination system 10. The transaction coordination system 10 may receive order interest requests, from parties such as, for example, customers, selling vendors, value chain participants, and the like. According to exemplary embodiments, FIG. 12 illustrates that requests related order interest information may be received from a website during at a pre-order state such as, for example, shopping cart contents on an ecommerce web site.

FIG. 12 also shows parties, such as, for example, customers, selling vendors, value participants, etc. may send as order confirmation information type requests to the system 10. These type of requests may be sent, for example, at any pending fulfillment stage (before processing and shipping of an order), in-transit stage (post fulfillment but pending final delivery of an order), or after delivery of an order.

In addition, FIG. 12 shows parties, such as, for example, customers, selling vendors, shipping vendors, value participants, etc. may send as shipping notification type requests to the system 10. These type of requests may be sent, for example, at any in-transit (during shipment of an order), or after delivery of an order.

The right half of FIG. 12, shows various permutation of results in response to requests that may be realized or implemented at least in part through the transaction coordination system 10, according to exemplary embodiments. For example, a customer's order which is pending fulfillment may be swapped with one or more other orders, a customer's order that is in transit may be rerouted to another party, or a customer's order that has been delivered may be re-shipped to another party.

According to exemplary embodiments, a shipping vendor's order which is pending fulfillment may be swapped with one or more other orders, a shipping vendor's order that is in transit may be rerouted to another party, or a new order may be placed on behalf the shipping vendor.

According to exemplary embodiments, an order placed with a shipping vendor may be swapped, rerouted, or a new order may be placed with the shipping vendor according to exemplary embodiments.

According to exemplary embodiments, a new order may be placed with the independent vendor and shipped to a party.

According to exemplary embodiments, an order being delivered by a shipping company may be rerouted.

According to exemplary embodiments, one or more value chain participants and/or shipping companies associated with an order may be swapped or changed according to exemplary embodiments.

Figure 13:
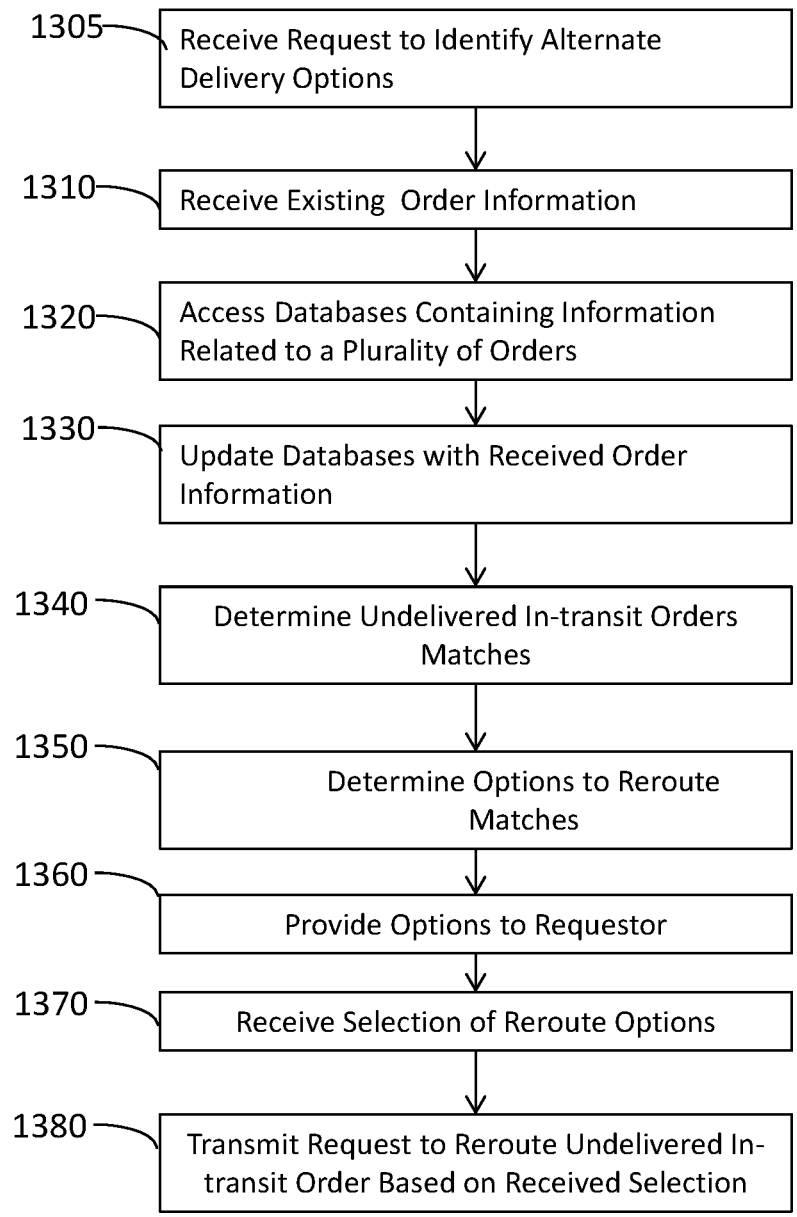
FIG. 13 is a flow chart illustrating a method to determine one or more alternate delivery options according to an exemplary embodiment of the present disclosure.

FIG. 13, shows according to an exemplary embodiment, a flow chart illustrating a method to determine one or more alternate delivery options for a requestors" existing orders. For example, the transaction coordination system 10 may receive a request to identify an alternate delivery option with respect to already placed order or existing order, 1305. A requestor, e.g., a customer, a shipping company, a vendor, etc., may indicate a preference for optimizing delivery and/or price, and any other factor, so that the system may determine matches. The system 10 may also separately, or with the request, receive the corresponding order information from one or more requesting entities, 1310. A requestor may be one or more of a customer/consumer, vendor, and or shipping company/carrier. The request and corresponding order information may be sent and/or received through any suitable means described herein.

In an exemplary embodiment the system 10 may access one or more databases associated with the system 10 in order to access information associated with one or more existing orders 1320. For example, with respect to the one or more existing orders, the databases may contain at least for each order: order identification, product, shipping, package status, and/or recipient information. The system 10 may update the one or more databases with the information regarding the received existing order 1330.

The system 10 may use at least in part the information in the databases to determine or identify one or more undelivered in-transit orders that contain a product that matches one or more products in the requestor's existing order, 1340 according to any suitable method described herein. Based on the identified or matching undelivered in-transit orders, the system 10 may determine one or more options to reroute the matching orders to the requestor 1350. The reroute options may be based on any factors described herein, such as for example, shipping costs, delivery time, social network relationships, prioritized list of trading partners, etc. For example, one or more parties associated with the system 10 may prefer one more trading partners (e.g, customer, vendors, shipping companies, etc.) which may be indicated to the system through any suitable means and stored on one or more databases associated with the system 10.

In an exemplary embodiment, the system 10, through an interface or any suitable means, may provide the reroute options to the requestor, 1360. The system 10, through any suitable means may receive a selection of one or the provided options 1370. After receiving a selection, the system 10 may transmit a request to reroute the in-transit order associated with the received selection. The request may sent through any suitable means described herein to a party, such as, for example, a shipping company, a customer, a vendor, etc.

Figure 14:
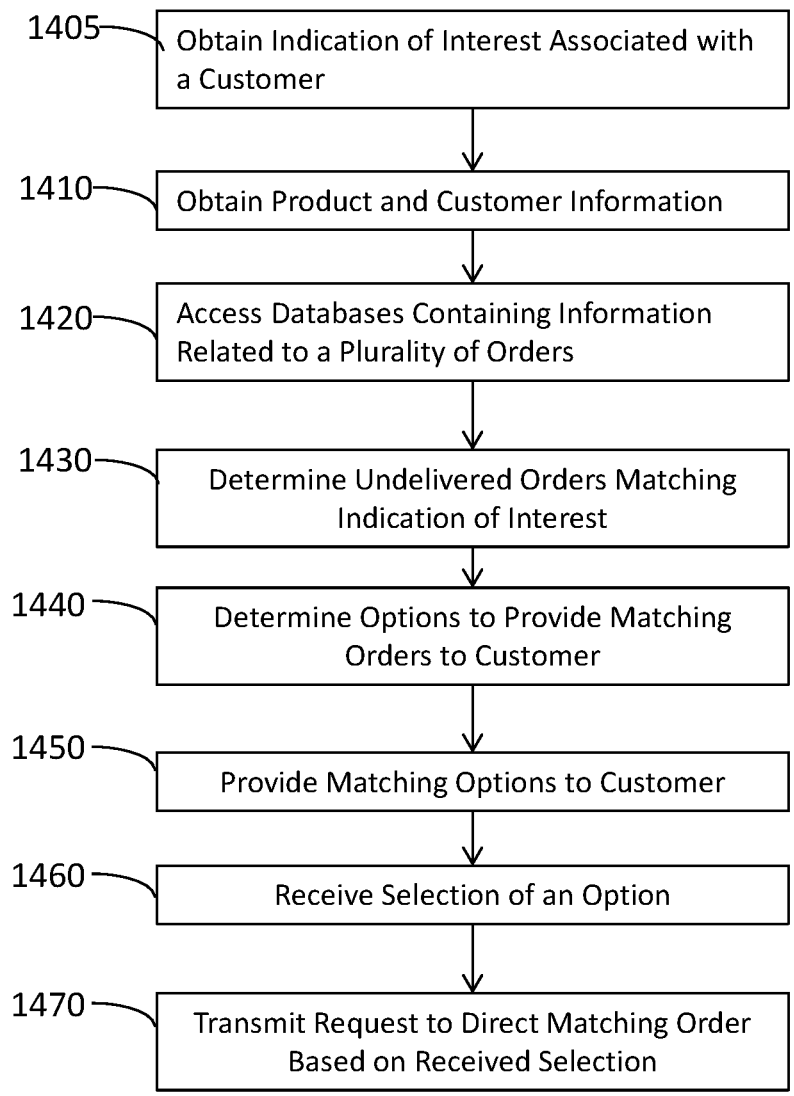
FIG. 14 is a flow chart illustrating a method to coordinate delivery of orders according to an exemplary embodiment of the present disclosure.

FIG. 14, shows according to an exemplary embodiment, a flow chart illustrating a method to coordinate delivery of orders. For example, the transaction coordination system 10 may obtain from a customer via a customer device, an indication of interest request with respect to one or more products, 1405. In exemplary embodiments, the indication of interest may be, for example, an indication that a customer is viewing a product on a website. In other exemplary embodiments, the indication of interest or order interest may be an indication that a customer has added the product to a shopping cart on a vendor's site. In some exemplary embodiments, the indication of interest may be a customer actually purchased a product, such as through a website or other suitable means.

The system 10 may also separately, or with the indication of interest, obtain the corresponding product information and customer information, 1410. A requestor may be one or more of a customer/consumer, vendor, and or shipping company/carrier. In an exemplary embodiment the system 10 may access one or more databases associated with the system 10 in order to access information associated with one or more existing orders 1420. For example, with respect to the one or more existing orders, the databases may contain at least for each order: order identification, product, shipping, package status, and/or recipient information. The system 10 may use at least in part the information in the databases to determine or identify one or more undelivered orders that contain a product that matches a product associated with the customer's indication of interest, 1430. Based on the identified or matching undelivered orders, the system 10 may determine one or more options to provide and/or direct the matching orders to the customer 1440. The options to provide and/or direct a matching order to the customer may be based on any factors described herein, such as for example, shipping costs, delivery time, social network relationships between the parties, prioritized list of trading partners, etc.

In an exemplary embodiment, the system 10, through an interface or any suitable means, may provide the options to the customer, 1450. The system 10, through any suitable means may receive a selection of one or the provided options 1460. After receiving a selection, the system 10 may transmit a request to direct the matching order associated with the received selection to the customer. The request may sent through any suitable means described herein to a party, such as, for example, a shipping company, a customer, a vendor, etc.

While the above description contains many specifics, these should not be construed as limitations on the scope of the application, but rather as exemplification of preferred embodiments. Numerous other variations of the present application are possible, and it is not intended herein to mention all of the possible equivalent forms or ramifications of this application.

What is claimed is:

1. A computerized system for improved e-commerce order processing through interaction via electronic communications with a plurality of shipping computer systems and vendor computer systems to maintain up-to-date order information, said computerized system comprising:

(a) one or more electronic databases stored on one or more non-transitory computer-readable storage media, the databases comprising order information for a plurality of respective orders including:
  (i) order identification information identifying the respective orders;
  (ii) product information identifying one or more products associated with the respective orders, wherein at least some of the product information was mapped by the system using a mapping engine to translate the product information into a common format with universal identifiers for each ordered product;
  (iii) delivery information identifying one or more of delivery entities, service types, delivery time periods, and delivery costs associated with the respective orders to the extent such information is available;
  (iv) package tracking information identifying a package status, including package locations, associated with delivery of the respective orders to the extent such information is available; and
  (v) respective recipient information identifying a recipient address associated with the respective orders;
  wherein at least some of the order information for the plurality of orders stored in the one or more electronic databases was obtained by automatically identifying and extracting the at least some of the order information from email software located on at least one of one or more remote email servers associated with one or more customers, which is operatively connected to the system;
(b) one or more computers comprising one or more processors operatively connected to the one or more electronic databases and configured to perform the following steps:
  (i) obtaining, by the one or more computers, information related to an opportunity to determine fulfillment options for one or more products, including:
    (1) obtaining by the one or more computers from a customer computing device associated with a first customer, a first indication of interest related to the one or more products;
    (2) obtaining by the one or more computers, product order information relating to the one or more products; and
    (3) obtaining customer information related to the first customer, including an address associated with the first customer;
  (ii) determining by the one or more computers using data in the one or more electronic databases, one or more undelivered orders for the one or more products associated with the first indication of interest based at least in part on one or more of the universal identifiers in the obtained product order information;
  (iii) determining by the one or more computers, one or more fulfillment options to direct at least one of the determined undelivered orders to the address associated with the first customer, based at least in part on the following factors:
    (1) the obtained first indication of interest;
    (2) delivery time period options;
    (3) cost information associated with each fulfillment option;
    (4) respective locations of the undelivered orders; and
    (5) the address associated with the first customer;
  (iv) providing from the one or more computers to the customer computing device via an electronic interface, at least one of the one or more fulfillment options;
  (v) obtaining, by the one or more computers from the customer computing device via the electronic interface, a first selection of the one or more fulfillment options, the first selection associated with a first undelivered order;
  (vi) generating, by the one or more computers, machine-readable routing instructions to reroute the first undelivered order to the address associated with the first customer; and
  (vii) transmitting, from the one or more computers to a second party associated with the first undelivered order, the machine-readable routing instructions.

2. The system of claim 1, wherein at least one of the determined undelivered orders is in-transit.

3. The system of claim 1, wherein at least one of the determined undelivered orders is an existing order that has not been shipped.

4. The system of claim 1, wherein obtaining the first selection of the one or more fulfillment options comprises obtaining, by the one or more computers, data associated with a user input from the customer computing device.

5. The system of claim 1, wherein obtaining the first selection of the one or more fulfillment options comprises obtaining an automatic selection based at least in part on pre-existing preferences associated with the first customer.

6. The system of claim 1, wherein the one or more computers further perform, before the step (vi) of generating the machine-readable routing instructions:
  obtaining, at the one or more computers, one or more authorizations to direct the first undelivered order associated with the first selection.

7. The system of claim 1, wherein the second party associated with the first undelivered order is a delivery entity.

8. The system of claim 1, wherein the second party associated with the first undelivered order is a vendor.

9. The system of claim 1, wherein the second party associated with the first undelivered order is a second customer.

10. The system of claim 1, wherein the one or more fulfillment options are based further at least in part on social network relationships between the first customer and one or more parties associated with the one or more determined undelivered orders.

11. The system of claim 10, wherein step (v) performed by the one or more computers further comprises providing to the customer computing device information identifying the social network relationships between the first customer and one or more parties associated with the one or more provided fulfillment options.

12. The system of claim 1, wherein the first indication of interest comprises information relating to an existing order placed by the first customer.

13. The system of claim 12, wherein the one or more computers further perform:
  (viii) transmitting, from the one or more computers to a vendor associated with the existing order placed by the first customer, a request to cancel the existing order.

14. The system of claim 1, wherein the machine-readable routing instructions to reroute the first undelivered order to the address associated with the first customer comprise a request to hold the first undelivered order at a location for pickup by the first customer.

15. The system of claim 1, wherein the machine-readable routing instructions to reroute the first undelivered order to the address associated with the first customer comprise a request to modify at least the respective recipient information associated with the first undelivered order.

16. The system of claim 1, wherein the delivery time period options comprise information regarding time required to deliver at least one of the determined undelivered orders to the address associated with the first customer.

17. The system of claim 1, wherein the one or more fulfillment options are further based at least in part on pre-existing preferential statuses of at least one of the first customer and one or more parties associated with the determined undelivered orders.

18. The system of claim 1, wherein the one or more computers further perform:
(viii) updating, by the one or more computers, the data in the databases with information associated with the first obtained selection of the one or more fulfillment options;
(ix) determining, by the one or more computers using data in the databases, a second set of one or more undelivered orders including at least one product matching the second product;
(x) determining, by the one or more computers, a second set of one or more fulfillment options to direct at least one of the second set of undelivered orders determined in step (ix) to a second address, wherein the second address is associated with the second party; and
(xi) providing, from the one or more computers to a computing device associated with the second party, at least one of the second set of fulfillment options determined in step (x).

19. The system of claim 1, wherein the customer information further comprises at least one selected from the group consisting of delivery information, payment information, and combinations thereof.

20. The system of claim 1, wherein the one or more computers further perform:
(viii) charging, using one or more of the computers, a fee to at least one party selected from the group consisting of the first customer, a vendor, and a delivery entity associated with the first selection of the one or more fulfillment options.

21. The system of claim 1, wherein at least one of the delivery entities is a shipping company.

22. The system of claim 1, wherein the one or more computers further perform:
(viii) obtaining, by the one or more computers, for one or more of the plurality of respective orders, updated information related to the respective delivery information or the respective package tracking information;
(xi) updating, by the one or more computers, the databases with the updated information;
(x) determining, by the one or more computers using data in the one or more electronic databases, a second set of one or more undelivered orders including a product matching the first product;
(xi) determining, by the one or more computers, a second set of one or more fulfillment options to direct at least one of the second set of one or more undelivered orders determined in step (x) based at least in part on the first indication of interest obtained from the customer computing device; and
(xii) providing, from the one or more computers to the customer computing device, at least one of the one or more fulfillment options determined in step (xi).

23. The system of claim 1, wherein the one or more computers further perform:
(viii) obtaining, at the one or more computers, second order information related to one or more additional orders;
(ix) updating, by the one or more computers, the one or more electronic databases with the second order information;
(x) determining, by the one or more computers using data in the one or more electronic databases, a second set of one or more undelivered orders including a product matching the first product;
(xi) determining, by the one or more computers, a second set of one or more fulfillment options to direct at least one of the second set of one or more undelivered orders determined in step (x) based at least in part on the following factors:
(1) the obtained first indication of interest;
(2) delivery time period options;
(3) cost information associated with each fulfillment option;
(4) respective locations of the undelivered orders; and
(5) the address associated with the first customer; and
(xii) providing, from the one or more computers to the customer computing device, at least one of the one or more fulfillment options determined in step (xi).

24. The system of claim 1, wherein the one or more computers further perform:
(viii) obtaining, by the one or more computers from a second customer computing device associated with a second customer, a second indication of interest related to one or more third products;
(ix) obtaining, by the one or more computers, second product information relating to the one or more third products;
(x) obtaining, by the one or more computers, second customer information related to the second customer, including a second address associated with the second customer;
(xi) accessing, using the one or more computers, the one or more electronic databases;
(xii) determining, by the one or more computers using data in the one or more electronic databases, one or more second undelivered orders including at least a fourth product matching the one or more third products related to the second indication of interest;
(xiii) determining, by the one or more computers, one or more second fulfillment options to direct at least one of the determined second undelivered orders to the second address, based at least in part on the following factors:
(1) the obtained second indication of interest;
(2) respective delivery time period options;
(3) cost information associated with each second fulfillment option;
(4) respective locations of the second undelivered orders; and
(5) the second address;
(xiv) providing, from the one or more computers to the second customer computing device, at least one of the one or more second fulfillment options;
(xv) determining, by the one or more computers, that none of the one or more second fulfillment options were selected; and
(xvi) updating, by the one or more computers, the data in the one or more electronic databases with the second indication of interest.

25. The system of claim 1, wherein the one or more computers further perform:
- (viii) obtaining, by the one or more computers from a second customer computing device associated with a second customer, a second indication of interest related to one or more third products;
- (ix) obtaining, by the one or more computers, second product information relating to the one or more third products;
- (x) obtaining, by the one or more computers, second customer information related to the second customer, including a second address associated with the second customer;
- (xi) accessing, using the one or more computers, the one or more electronic databases;
- (xii) determining, by the one or more computers using the data in the one or more electronic databases, one or more second undelivered orders including at least a fourth product matching the one or more third products related to the second indication of interest;
- (xiii) determining, by the one or more computers, a lack of one or more second fulfillment options to direct at least one of the determined second undelivered orders to the second address, based at least in part on the following factors:
  - (1) the obtained second indication of interest;
  - (2) respective delivery time period options;
  - (3) cost information associated with each second fulfillment option;
  - (4) respective locations of the second undelivered orders; and
  - (5) the second address; and
- (xiv) updating, by the one or more computers, the data in the one or more electronic databases with the second indication of interest.

26. The system of claim 1, wherein the package tracking information further includes any of shipment tracking numbers, delivery time estimates, current shipment locations, or delivery route.

* * * * *